(12) United States Patent
Simpson et al.

(10) Patent No.: US 6,859,310 B2
(45) Date of Patent: Feb. 22, 2005

(54) SYSTEM AND METHOD FOR FILTERING ELECTROMAGNETIC AND VISUAL TRANSMISSIONS AND FOR MINIMIZING ACOUSTIC TRANSMISSIONS

(75) Inventors: Deron Simpson, Finksburg, MD (US); Lisa Y. Winckler, Collinsville, VA (US); Ronald L. Spraker, Martinsville, VA (US)

(73) Assignees: ASTIC Signals Defenses LLC, Baltimore, MD (US); CP Films, Martinsville, VA (US)

( * ) Notice: Subject to any disclaimer, the term of this patent is extended or adjusted under 35 U.S.C. 154(b) by 0 days.

(21) Appl. No.: 10/446,133

(22) Filed: May 28, 2003

(65) Prior Publication Data

US 2003/0224182 A1 Dec. 4, 2003

Related U.S. Application Data

(60) Provisional application No. 60/338,197, filed on Jun. 13, 2002, and provisional application No. 60/383,137, filed on May 28, 2002.

(51) Int. Cl.$^7$ ................................................ G02B 5/20
(52) U.S. Cl. ...................... 359/359; 359/360; 359/361
(58) Field of Search ................................ 359/359–361; 174/35; 428/195, 212–215, 336

(56) References Cited

U.S. PATENT DOCUMENTS

| | | |
|---|---|---|
| 3,943,105 A | 3/1976 | Hermes |
| 4,557,980 A | 12/1985 | Hodnett ...................... 428/336 |
| 4,953,324 A | 9/1990 | Herrmann ..................... 49/255 |
| 4,978,812 A | 12/1990 | Akeyoshi et al. |
| 4,982,053 A | 1/1991 | Thornley et al. ............. 174/35 |
| 4,992,329 A | 2/1991 | Ishii et al. .................. 428/328 |
| 5,008,486 A | 4/1991 | Terakawa et al. ............. 174/35 |
| 5,012,041 A | 4/1991 | Sims et al. ................... 174/35 |
| 5,017,419 A | 5/1991 | Smith ......................... 428/209 |
| 5,017,736 A | 5/1991 | Yarger et al. ................. 174/35 |
| 5,045,636 A | 9/1991 | Johnasen et al. ............. 174/35 |
| 5,097,885 A | 3/1992 | Kitagawa .................... 160/84.1 |
| 5,098,735 A | 3/1992 | Henry .......................... 427/8 |
| 5,208,425 A | 5/1993 | Hasegawa et al. ............ 174/35 |
| 5,218,472 A | 6/1993 | Jozefowicz et al. |

(List continued on next page.)

FOREIGN PATENT DOCUMENTS

| | | |
|---|---|---|
| WO | WO 01/44840 A1 | 6/2001 |
| WO | WO 02/41041 A2 | 5/2002 |

OTHER PUBLICATIONS

International Search Report dated Sep. 30, 2003 for Application No. PCT/US03/13408.
U.S. patent application Publication No. U.S. 2002/0090507 A1, published on Jul. 11, 2002.
International Search Report for International Application PCT/US02/13735 dated May 25, 2004.

Primary Examiner—Mohammad Sikder
(74) Attorney, Agent, or Firm—Hogan & Hartson LLP

(57) ABSTRACT

The invention describes a system and methods for filtering electromagnetic and visual transmissions and for minimizing acoustic transmissions. Various combinations of UV, IR, and yellow-tinted filters are applied in various physical configurations to a transparent substrate such as a plastic film or glazing of a window for modifying selected wavelengths of electromagnetic radiation. For instance a light filter may have a multi-layered metallic sputtered stack having a relatively low sheet resistance. The combination of filters prevents or attenuates the passage of selected wavelengths through the substrate as needed to address security risks. The combination of filters is useful to prevent unauthorized data collection and information exchange from or within buildings or otherwise prevent such unauthorized data collection and information exchange from, for example, computer monitors or screens, personal digital assistants, and local area networks.

27 Claims, 14 Drawing Sheets

U.S. PATENT DOCUMENTS

| | | | |
|---|---|---|---|
| 5,244,708 A | 9/1993 | Tsuchida et al. | 428/77 |
| 5,276,277 A | 1/1994 | Hightower et al. | 174/35 |
| 5,286,318 A | 2/1994 | Sims et al. | 156/71 |
| 5,325,094 A | 6/1994 | Broderick et al. | 342/1 |
| 5,368,917 A | 11/1994 | Rehfeld et al. | 428/215 |
| 5,401,901 A | 3/1995 | Gerry et al. | 174/35 |
| 5,496,966 A | 3/1996 | Hightower et al. | 174/35 |
| 5,510,575 A | 4/1996 | Weibler | 174/35 |
| 5,595,801 A | 1/1997 | Fahy et al. | 428/40.1 |
| 5,603,196 A | 2/1997 | Sohlström | 52/796.1 |
| 5,736,671 A | 4/1998 | Perälä et al. | 174/35 |
| 5,763,063 A | 6/1998 | Pass et al. | |
| 5,796,055 A | 8/1998 | Benson, Jr. et al. | 181/208 |
| 5,811,923 A | 9/1998 | Zieba et al. | 313/479 |
| 5,853,889 A | 12/1998 | Joshi et al. | 428/411.1 |
| 5,855,988 A | 1/1999 | Matsuo | 428/195 |
| 5,965,056 A | 10/1999 | Okuyama et al. | 252/62.59 |
| 5,965,853 A | 10/1999 | Hornsey | 181/289 |
| 5,981,927 A | 11/1999 | Osepchuk et al. | 219/740 |
| 5,991,072 A | 11/1999 | Solyntjes et al. | 359/360 |
| 6,007,901 A | 12/1999 | Maschwitz et al. | 428/216 |
| 6,011,504 A | 1/2000 | Tan | 342/4 |
| 6,028,699 A | 2/2000 | Fisher | 359/360 |
| 6,037,046 A | 3/2000 | Joshi et al. | 428/212 |
| 6,074,732 A | 6/2000 | Garnier et al. | 428/215 |
| 6,086,979 A | 7/2000 | Kanbara et al. | 428/209 |
| 6,090,478 A | 7/2000 | Nishizaki et al. | 428/297.4 |
| 6,119,807 A | 9/2000 | Benson, Jr. et al. | 181/208 |
| 6,157,486 A | 12/2000 | Benson, Jr. et al. | |
| 6,221,112 B1 | 4/2001 | Snider | 8/470 |
| 6,392,782 B1 | 5/2002 | Bloemer et al. | |

SYSTEM AND METHOD FOR FILTERING ELECTROMAGNETIC AND VISUAL TRANSMISSIONS AND FOR MINIMIZING ACOUSTIC TRANSMISSIONS

CROSS-REFERENCE TO RELATED APPLICATIONS

This application claims priority from U.S. Provisional Patent Application No. 60/383,137, filed on May 28, 2002, entitled "A System and Methods for Filtering Electromagnetic, Visual, and Minimizing Acoustic Transmissions," and U.S. Provisional Patent Application No. 60/388,197, filed on Jun. 13, 2002, entitled "A System and Methods for Filtering Electromagnetic, Visual, and Minimizing Acoustic Transmissions."

FIELD OF THE INVENTION

The invention relates to a system and method for filtering electromagnetic and visual transmissions, and for minimizing acoustic transmissions for security purposes. More specifically, the invention provides a system and methods to prevent unauthorized data collection and information exchange from or within buildings (such as through windows, doorways, other fenestration, or openings) or otherwise prevent such unauthorized data collection and information exchange from, for example, computer monitors or screens, personal digital assistants, and local area networks.

BACKGROUND OF THE INVENTION

Discussion of Related Art

Electromagnetic radiation of various frequencies is radiated from many devices used in a wide range of facilities including homes, workplaces such as offices, manufacturing and military installations, ships, aircraft and other structures. Examples of such devices include computers, computer monitors, computer keyboards, radio equipment, communication devices, etc. If this radiation escapes from the facility, it can be intercepted and analyzed for the purpose of deciphering data associated with or encoded in the escaped radiation. For example, technology exists for reconstructing the image appearing on a computer monitor in a building from a remote location outside the building or from a location within a building by detecting certain wavelength frequencies from the monitor screen even if the monitor screen is not in view from the remote location. This is accomplished by known techniques wherein certain frequencies of light from the monitor screen, even after being reflected from various surfaces inside the building or room where the monitor is located, escape and are intercepted and analyzed by an eavesdropper in another location outside the building or room where the monitor is located. Obviously, the ability of an eavesdropper to intercept such radiation constitutes a significant security risk that is desirably eliminated from facilities where secrecy is essential.

Although walls, such as brick, masonry block or stone walls may effectively prevent the escape of light frequencies from a facility, radio frequencies pass through walls that are not properly grounded to prevent such passage. Moreover, windows or other openings allow the passage of radiation to the outside where it can be intercepted, and permit entry of various forms of radiation, such as laser beams, infrared, and radio frequencies, into the facility. As a result, sensitive or secret data may be gathered from within the structure.

Indeed, the United States Government has long been concerned by the fact that electronic equipment, such as computers, printers, and electronic typewriters, give off electronic emanations. The TEMPEST (an acronym for Transient Electromagnetic Pulse Emanation Standard) program was created to introduce standards that would reduce the chances of leakage of emanations from devices used to process, transmit, or store sensitive information. This is typically done by either designing the electronic equipment to reduce or eliminate transient emanations, or by shielding the equipment (or sometimes a room or entire building) with copper or other conductive materials. Both alternatives can be extremely expensive.

The elimination of windows and other openings from a structure would obviously minimize the above-noted security risk. The disadvantages of a windowless or enclosed structure, however, are self-evident. It would be highly desirable, therefore, to prevent the escape of radiation associated with data through windows, doorways, or other openings while allowing other radiation to pass therethrough so that the enjoyment of the visual effects provided by such openings can be obtained without an undue security risk.

In addition to the security risks associated with the passage of certain wavelengths of electromagnetic radiation, acoustic transmission through a window, door or other opening also poses a security risk. It would be of additional benefit if transmission of both acoustic and the aforementioned electromagnetic radiation through openings could be minimized or avoided while preserving the visual benefits provided thereby.

The need for reducing the undesirable effects of the sun-its heat, excessive energy usage, glare, and ultraviolet (UV) radiation-has led to the development of solar control window films. Solar control window films are thin polyester sheets that are mounted on the glass windows of buildings and automobiles via an adhesive. It is said that such films are effective in providing comfort, visibility, and increased energy efficiency.

In the current workplace or home environment, however, there is a need for more protection than solar control films can provide. For example, it is important to protect the work product of an individual, business, or other entity from unauthorized data collection through the glass windows or other openings of their offices. The conventional solar control films described above are, for the most part, incapable of rejecting the wide range of frequencies used for such unauthorized data and information exchange.

Given the importance of security in today's competitive marketplace, a system that could preserve the privacy of the workplace is very desirable. Such a system would provide both comfort and security that in turn can bring about many benefits, including increased productivity and the preservation of confidentiality in both the public and private sectors.

SUMMARY OF THE INVENTION

Accordingly, the present invention provides a system and method for filtering electromagnetic, visual, and minimizing acoustic transmissions by using a combination of filters that substantially obviates one or more of the problems due to the limitations and disadvantages of the related art. The invention further provides a system and methods whereby a combination of films has a shielding effectiveness that attenuates the transmission of radio frequency wavelengths there-through and preferably has a shielding effectiveness of 22 db–40 db in the frequency range of 30 megahertz-3 gigahertz; an IR transmission at wavelengths between 780 nm and 2500 nm of no more than 50%, and preferably of less than 20%, and more preferably of about 15%; and reduces the ability of anyone working in the ultraviolet (UV) through to the visible spectrum up to at least 450 nanometers, to penetrate a building or other surface by at least 99%.

To achieve these and other advantages and in accordance with the purpose of the present invention, as embodied and broadly described, the system and methods of the present invention include a combination of electromagnetic radiation filters, such as selective radiation absorbers and/or selective radiation reflectors. These may be part of a window. The system and methods according to the invention have, however, non-exclusionary applications; the invention can be interposed between glass surfaces or applied to every type of glazing. The system and methods according to the invention can also be used for free standing product application for computer screens, monitors and other stand-alone devices. Further, the system and methods according to the invention may be configured to form a separate covering that may be placed over computer screens, monitors and other stand-alone devices. The example of windows discussed herein is employed for convenience and is not intended to be limiting as to surface application.

The radiation filters of the combination may be individual or combined layers plied to a window in any sequence so that light that passes through the window, passes through the radiation filters used in the combination. The radiation filters may be applied on any surface of the glazing (i.e., glass or other transparent material used for windows) of the window to form a multilayered structure of the filters on the glazing. It is not essential for all the layers to be contiguous to each other on one surface of the glazing. Instead, the filters may be distributed in any manner over or in the glazing of a window so as to prevent the passage of the wavelengths that would pose a security risk if they were allowed to pass through the window. For example, one filter may be on one surface of a glass pane while the remaining filters may be distributed as a single or multilayer structure on another surface of the glass layer (e.g., glass pane) or the filters may be distributed on any of the surfaces of a plurality of glass layers of a window (e.g., a multi-glazed window structure such as a double or triple glazed window structure).

In addition, any or all of the filters may be used in conjunction with a conventional glass interlayer such as the glass interlayer used in conventional safety glass that comprises a plastic interlayer such as polyvinylbutyral (PVB) interposed between two glass layers. The filters may be incorporated in, deposited on, or laminated to or within the interlayer in that case the filters will be within the glazing of the window.

Each filter of the combination of filters is advantageously in the form of an individual layer or coating, but this is not essential. In the case of filters that are absorbers (filters that use a particular dye, metal, metal salt or pigment to absorb a desired wavelength or range of wavelengths), the entire combination of absorbers or a portion of the combination may be in the form of a mixture of dyes, metal, metal salt or pigments in a single layer as a coating or may be incorporated in a component of the window such as in the polyvinylbutyral interlayer used in safety glass or in an adhesive layer used to adhere film, sheets or the like to the glass. It is also possible to incorporate one or more of the absorbers as a mixture in a film or sheet attached to the window or as layers applied to or coated onto a film or sheet. The PVB layer or the adhesive layer may include electrically conductive particles therein in an amount to render the PVB or the adhesive conductive.

The film or sheet may be any of the films or sheets used to make conventional solar control films. An example of a film used for this purpose includes, polyethylene terephthalate (PET), but others may be used as well.

When a film or sheet is used in combination with glass, it is not essential for the entire combination of filters to be in or on the film or sheet. For example, one or more filters may be associated with the film or sheet as described above while any remaining filters may be connected to the glass as described above or vice versa. It is also possible to include a layer that comprises a mixture of absorbers with another layer that is a different filter to make the desired combination. For example, two absorbers such as dyes or pigments of the combination may be used as a mixture as two filters of the combination, and another filter of the combination may be in the form of a distinct layer or coating such as a metal reflecting or absorbing layer.

Moreover, it is not essential for the entire combination of filters to be distributed on the same surface. For example, one or more of the filters may be applied to the glazing of a window while remaining filters may be applied to computer screens or monitors, personal digital assistants, or other stand-alone devices.

It is also not essential for the combination of filters to be attached to a surface of a window, computer screen or monitor, personal digital assistant or other stand-alone device. For example, the combination of filters may be configured to form a separate covering that may be soft and pliable, such as a bag. In this embodiment the combination of filters may be advantageously attached to a clear or transparent flexible substrate (e.g., PET sheet or film) that may be configured into the shape of a bag. When configured as a separate covering such as a bag, the combination of filters may be placed over computer screens or monitors, personal digital assistants, or other stand-alone devices, may be easily used and removed, and preferably may be disposable. Alternatively, the combination of filters may be configured as a containment system, such as in the form of tent or sheet, thereby covering an entire workstation, including an outdoor or mobile workstation. As discussed above, it is not essential for the entire combination of filters to be configured to form the separate covering. For example, one or more of the filters may be in the form of all or part of a containment system, while remaining filters may be applied to computer screens or monitors, personal digital assistants, or other stand-alone devices. Thus, filters applied to a computer screen, monitor or other device can work in conjunction with the filters applied to the bag, tent or sheet to produce the desired effect.

Any coatings, layers, films, sheets, lamina or the like used in this invention may be applied to a component of the window (e.g., the glass or interlayer component) by techniques that are conventional and well known to those skilled in the art. For example, metal layers may be applied by conventional sputtering techniques or evaporative coatings techniques. Any of the various layers may be adhered to the glass by means of conventional adhesives.

Although glass is described herein as the typical material that is used to make a window, it is to be understood that other clear or transparent materials that are useful for making windows may be substituted for the glass. For example hard plastics such as polycarbonate, plexiglass, acrylic plastic, etc., may be used as a substitute for the glass.

In view of the above, it will be appreciated by one skilled in the art that the required combination of filters may be associated with the window in any manner or sequence providing they are configured to prevent passage of the critical wavelengths therethrough for achieving the above-described security feature. Optionally additional conventional components or layers may be applied to the window to improve the aesthetics and/or visual characteristics of the window or to provide additional solar control, anti-reflection or radiant heat exclusion or safety and security characteristics in accordance with known techniques.

The desired effect of the present invention (i.e., filtering the passage of certain wavelengths through the window) can be achieved with any type of light filter or light valve that prevents the passage of the selected wavelengths. Thus, for example, the light filters or light valves used in this invention may be any of the absorbers described above or any other type of light filter or light valve such as a wavelength selective reflective layer or any combination of different types of light filters and light valves. For example, light absorbers may be combined with reflective layers.

It will be appreciated that the filters used in this invention are selective with respect to the wavelengths being filtered and thus the glazing remains sufficiently transparent for use as a window. Sufficient transparency is achieved by allowing visible light transmission of at least 1%, although a higher visible light transmission of, at least, approximately 25–30% is preferred, with a transmission of 50%–70% being more preferred.

According to one embodiment, the invention uses a combination of filters comprising, in no particular order, a yellow film layer (including the type used to produce stage or drama lighting), a museum-grade film layer, and a tinted film layer (similar to, but not necessarily the same as, the type applied on automotive glass). To achieve the system of the present invention, the film layers may be combined in any order, and in any manner, including being overlaid or mixed.

The combinations of filters may be advantageously connected to a transparent substrate and are configured so as to exclude the passage of the selected wavelengths therethrough, such as by absorption and/or reflection of the selected wavelengths. Thus, uncoated or exposed areas that would permit the passage of the selected wavelengths should be avoided.

Although the filters are connected to the substrate, each filter does not have to be directly connected to the substrate. In other words, the connection of a filter layer may be made by connecting the filter layer to another filter layer that was previously connected to the substrate so that one filter layer is connected to the substrate via another filter layer. For example, when two filter layers are located on one side of the substrate, one filter layer is directly connected to the substrate while the other filter layer is connected to the substrate via the first filter layer (i.e., indirectly connected). The same applies in instances where more than two filter layers are connected to one side of the substrate. In other words, being connected to the substrate in this invention is intended to cover both direct and indirect connections. Also, when a filter is formed by mixing or impregnating absorbents such as dyes or pigments into a component, the filter comprised of dye and/or pigment is considered in the context of this invention as being connected to the component.

Instead of coating the filter as a layer on the substrate, the filter may be connected to the substrate by a lamination process wherein a previously formed filter layer is laminated onto the substrate either directly or indirectly.

The substrate may be the glazing of the window or may be a flexible transparent sheet (e.g., plastic sheets such as PET) that is then connected to the glazing. A portion of the combination of filters may be connected to the glazing and another portion of the combination of filters may be connected to one or more flexible transparent sheets that are connected to the glazing. Alternatively, the flexible transparent substrate with the combination of filters attached thereto may be configured as a bag to contain a computer screen or monitor, personal digital assistant or other stand-alone device placed therein. Preferably the bag is sealed or tightly closed with the computer screen or monitor, digital assistant or other stand alone device therein so that the wavelengths to be filtered will not escape from the bag. The flexible substrate with the combination of filters attached thereto may also be configured as a tent for temporary field applications so that personnel and the computer screen or monitor, etc., may be inside the tent. In use the tent should cover the personnel and equipment inside to prevent leakage of the wavelengths that are to be filtered.

All of the filters do not have to be applied to a single substrate. For example, in a multi-glazed window, the combination of filters may be distributed on one or more of the glass sheets of the glazing either as a coating or layer on the glass and on one or more sheets connected to the glass.

At least one of the filters may be advantageously electrically conductive to inhibit the passage of radio waves through the window.

The substrate may include other conventional solar control elements such as light absorbing layers, anti-reflecting layers, or reflectors thereon.

The system and method of the present invention may also be used as a Glass-fragmentation Safety Film and, as such, may be used to minimize flying glass fragments in real world situations. To accomplish this objective the flexible sheet may include one or more layers that inhibit glass fragments from becoming dangerous flying projectiles when the window breaks due to explosion, implosion, or due to force from a projectile. A suitable layer for this purpose is polyester film (e.g., PET) or other flexible clear film. For example a 7 mil thick PET film is adequate for this purpose. The PET film may be adhered to the film containing the combination of filters with an adhesive (e.g., a pressure sensitive adhesive such as an acrylic pressure sensitive adhesive or any of the other adhesives described herein). A suitable acrylic pressure sensitive adhesive includes Gelva 263 available from UCB Inc. that includes 8% by weight of benzophenone type UV absorber for light stability. The pressure sensitive adhesive may be coated at a rate of 4 lbs. per ream coat rate.

The film used to provide glass fragmentation protection should be located on the glass surface of a window that is in the interior of the building to prevent glass fragments from causing injury to occupants in the building.

The invention may also encompass a combination of filters that provides high visible light transmission and low electrical resistance (less than 4 ohms/square) for enhanced attenuation of electromagnetic interference (EMI) and enhanced attenuation of radio frequency interference (RFI) as well as effective filtering of UV and IR light. Some embodiments of the combination of filters provided by this invention are particularly useful for shields that are applied to plasma display screens and other display screens that emit large amounts of EMI/RFI, UV light or IR light. The shields provide the monitor with a security feature that is useful for preventing unauthorized surveillance of the display screen.

The invention also provides for the selection of various combinations of filters to customize the anti-surveillance security features to suit a particular need. This is because the combination of filters that affords the highest level of anti-surveillance security typically produces light transmission characteristics that are not aesthetically pleasing when used on a window. In particular, some filters used in the invention produce a yellow color that is aesthetically unpleasing when applied to a window. Not everyone needs such a high level of security that would necessitate compromising visual aesthetics. For many applications, e.g., business and home use, it may be desirable to eliminate the yellow filter from the combination to improve visual aesthetics while still providing an acceptable level of security.

The invention also provides for the inclusion of color correcting layers in the combination of filters to correct the undesired yellow color associated with the yellow filter.

BRIEF DESCRIPTION OF THE DRAWINGS

The accompanying drawings that are included to provide further understanding of the invention and are incorporated in and constitute a part of this specification, illustrate embodiments of the invention and together with the description, serve to explain the principles of the invention.

Figure 1:
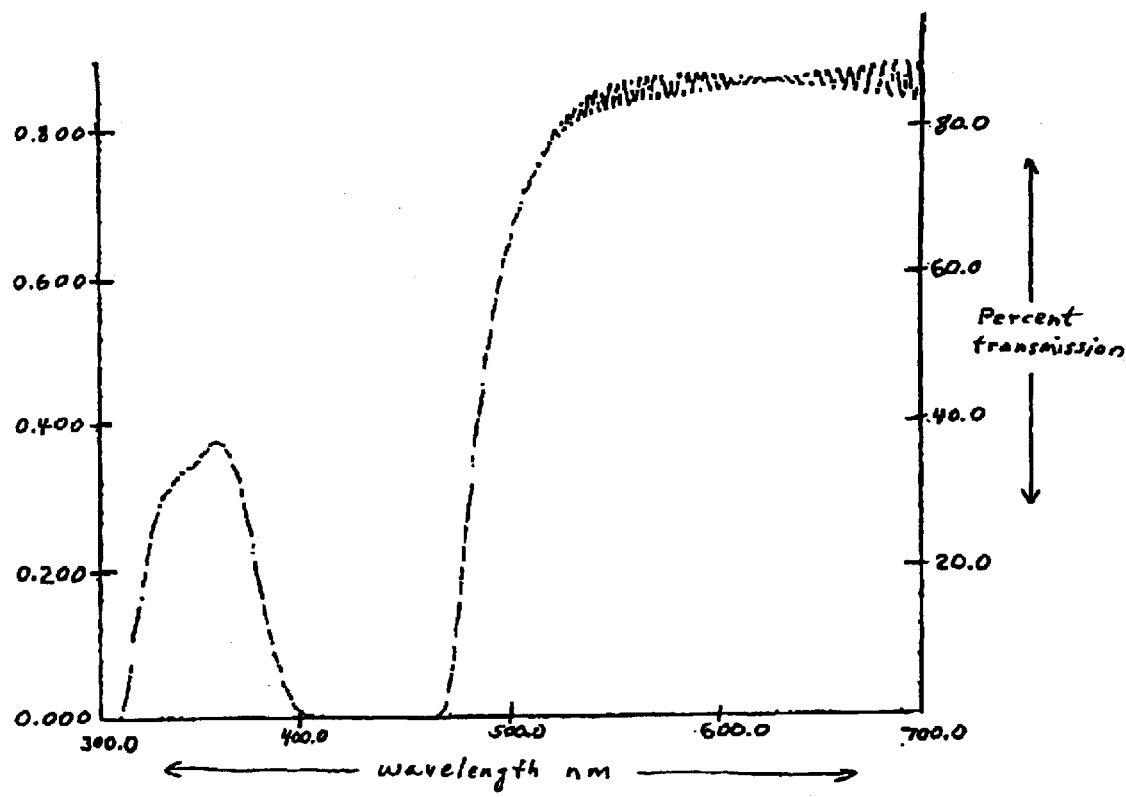
Figure 2:
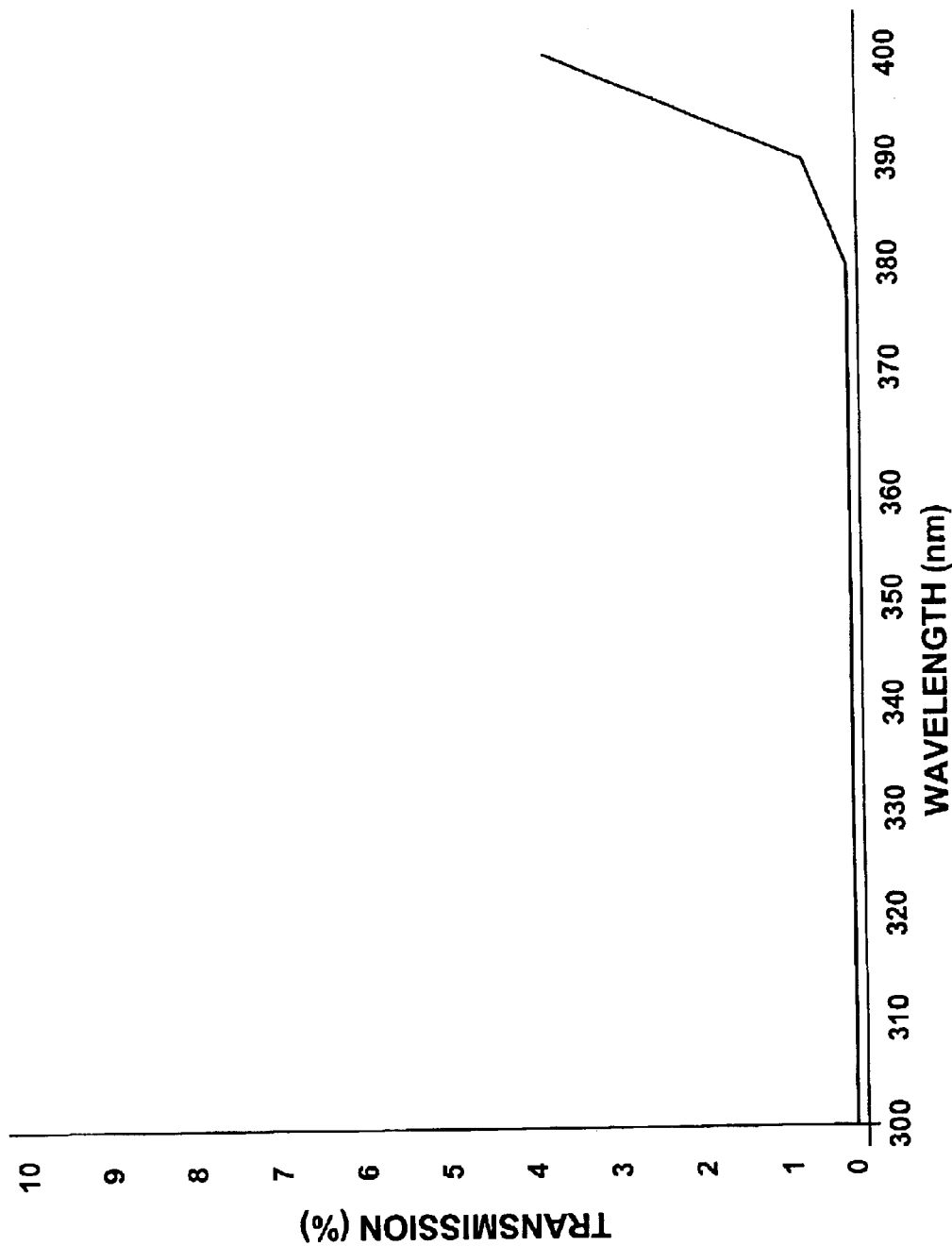
Figure 3:
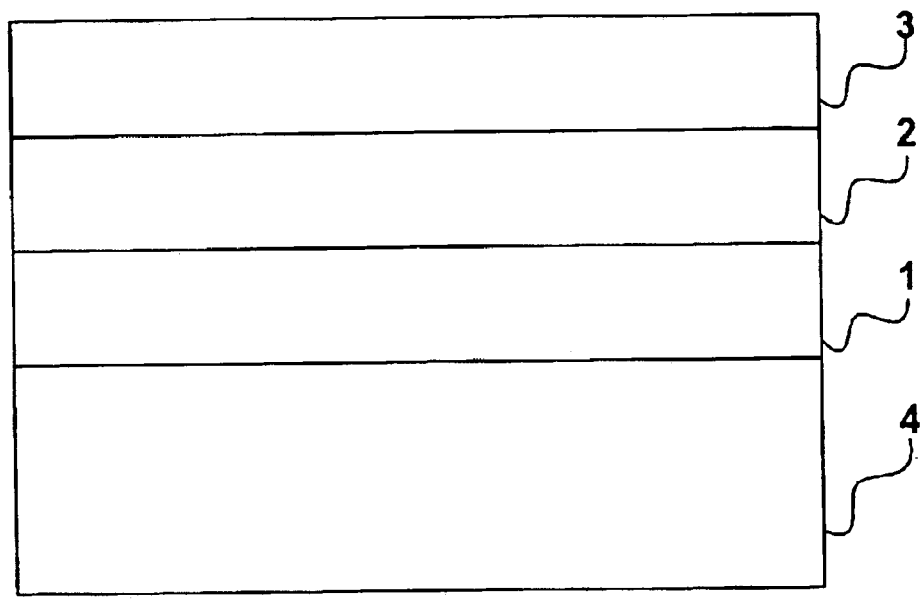
Figure 4:
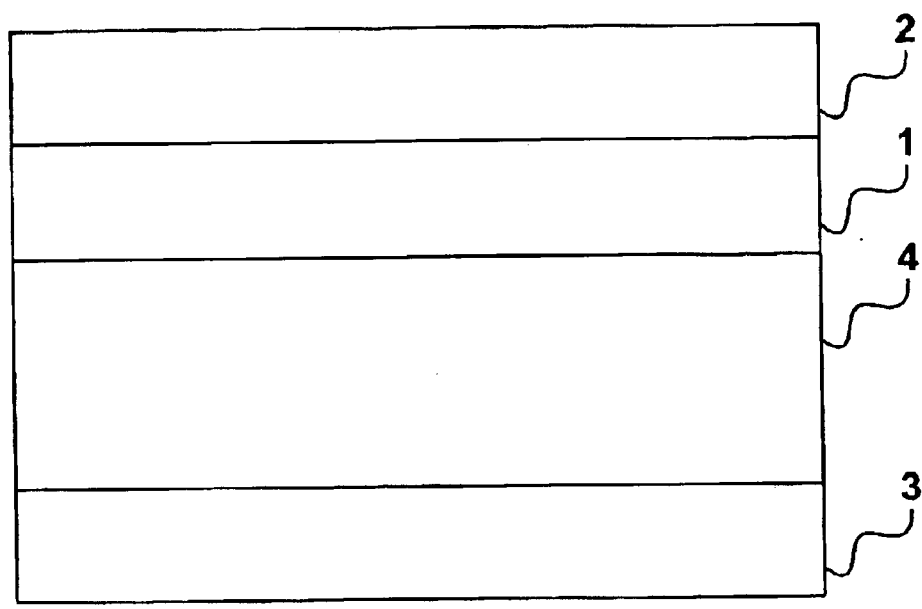
Figure 5:
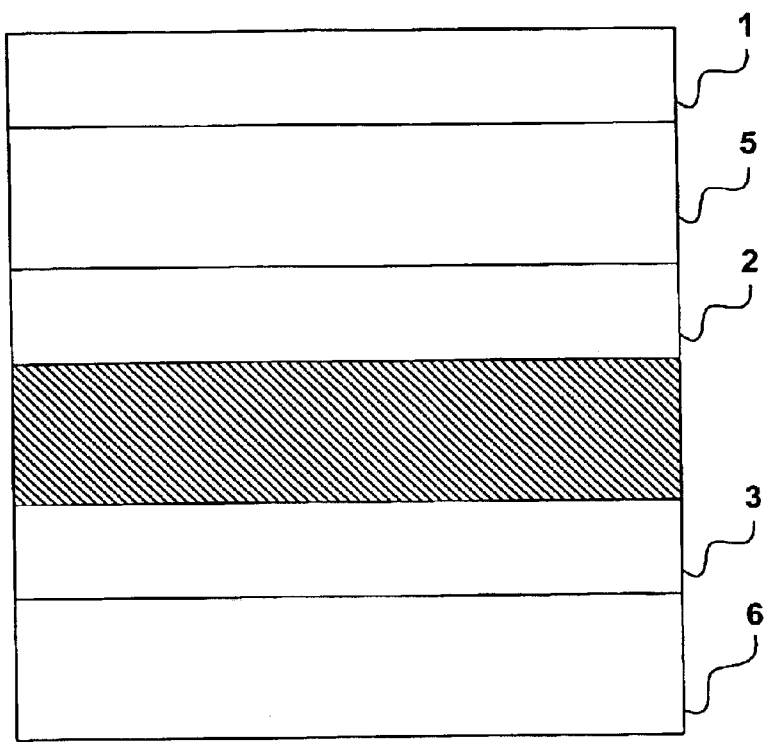
Figure 6:
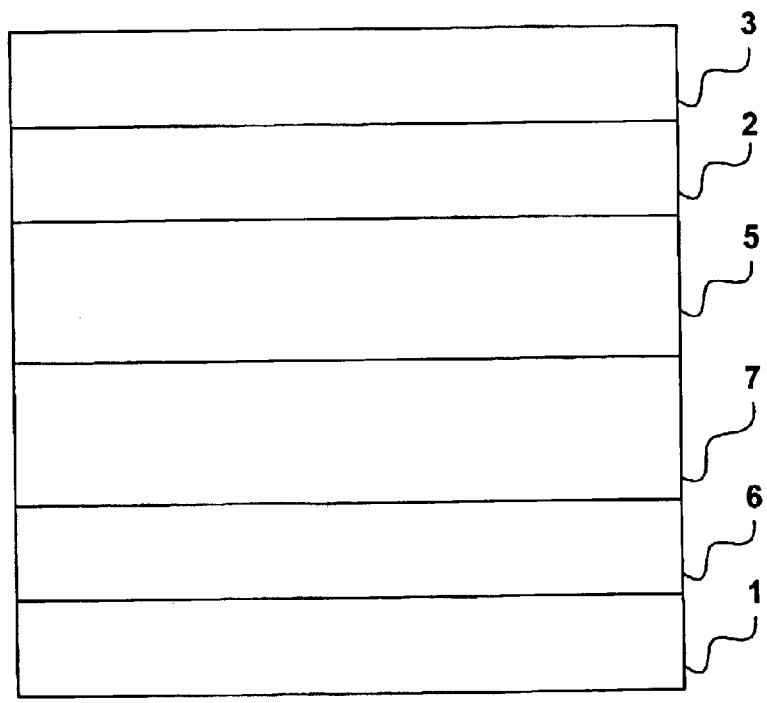
Figure 7:
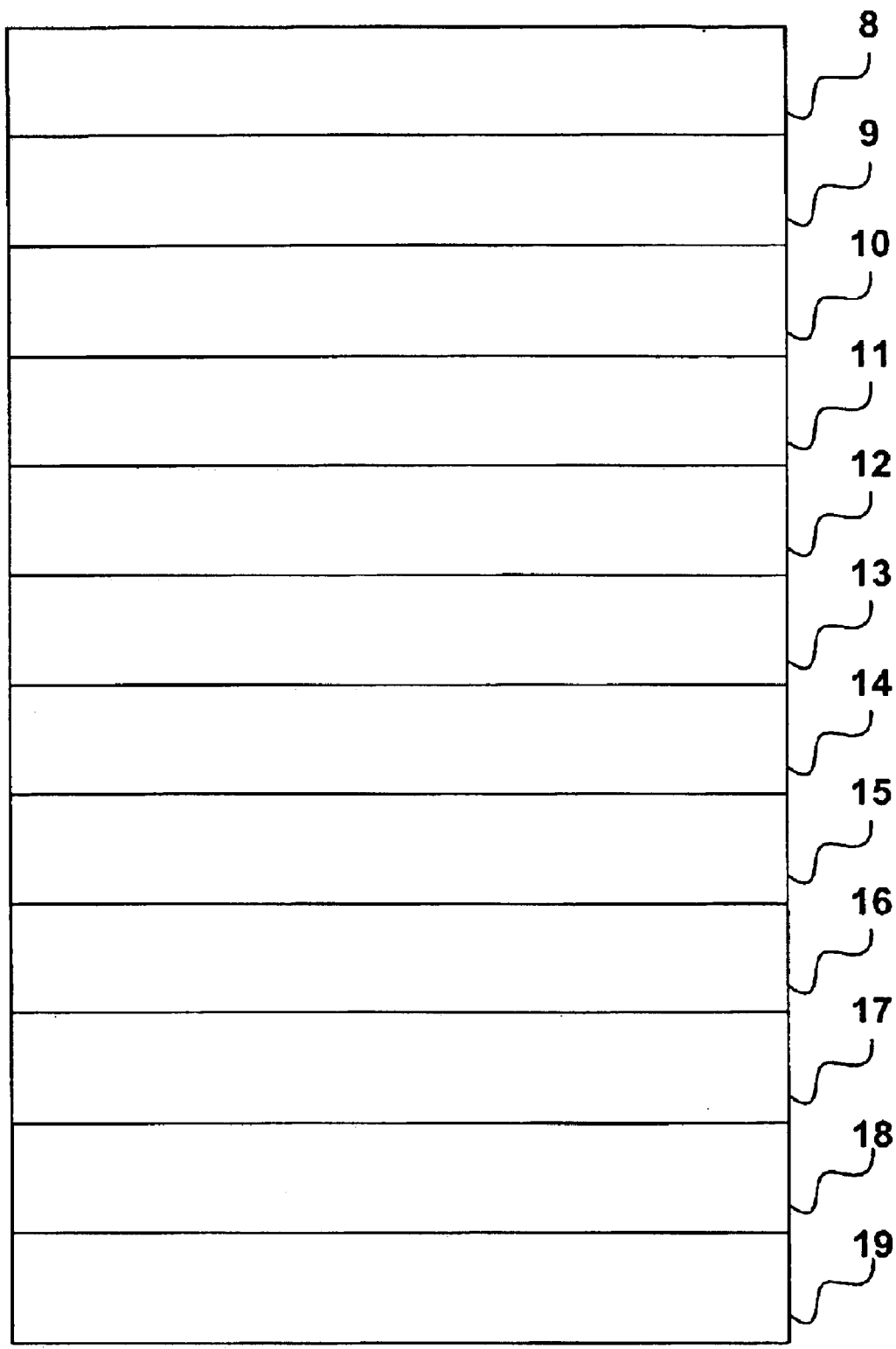
Figure 8:
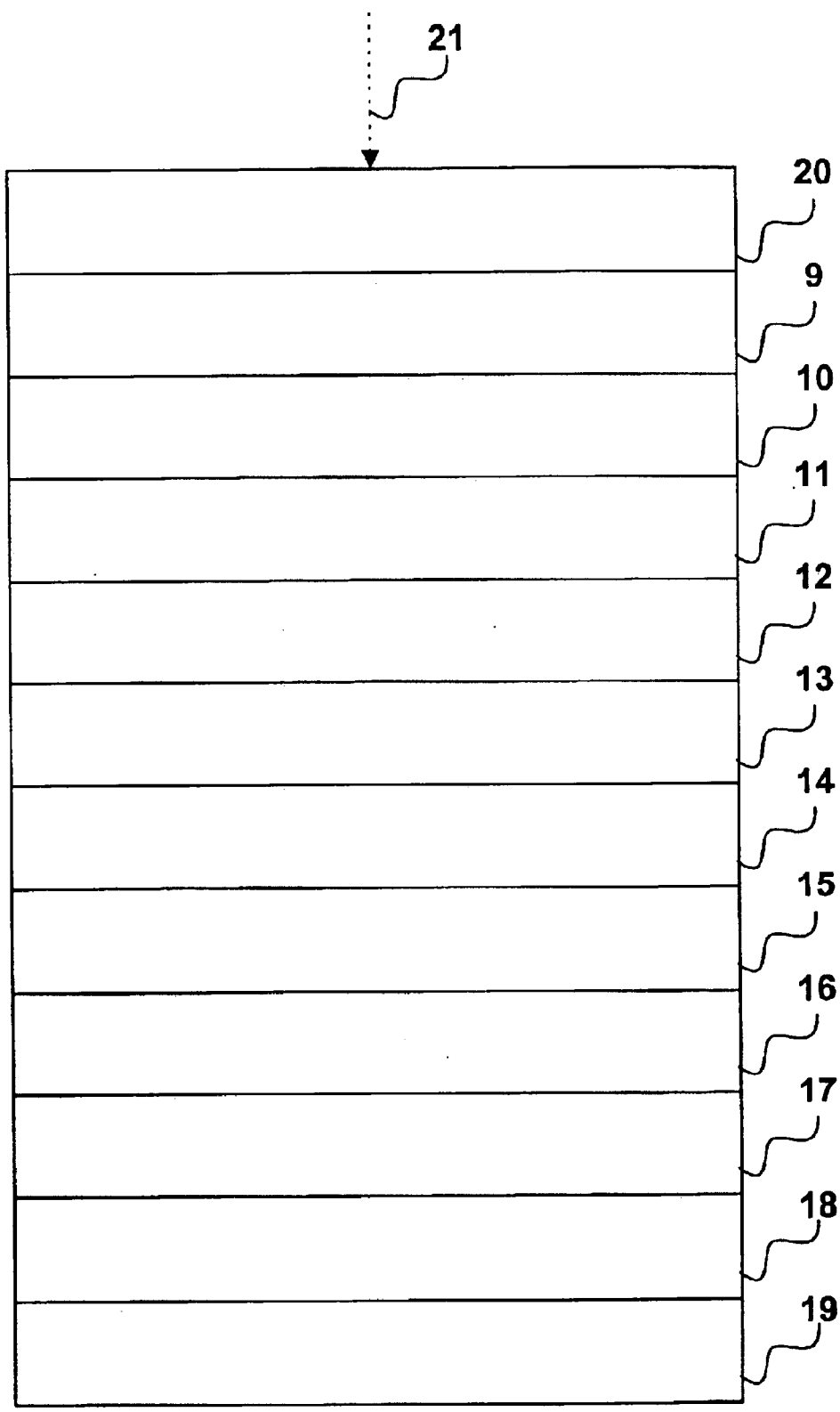
Figure 9:
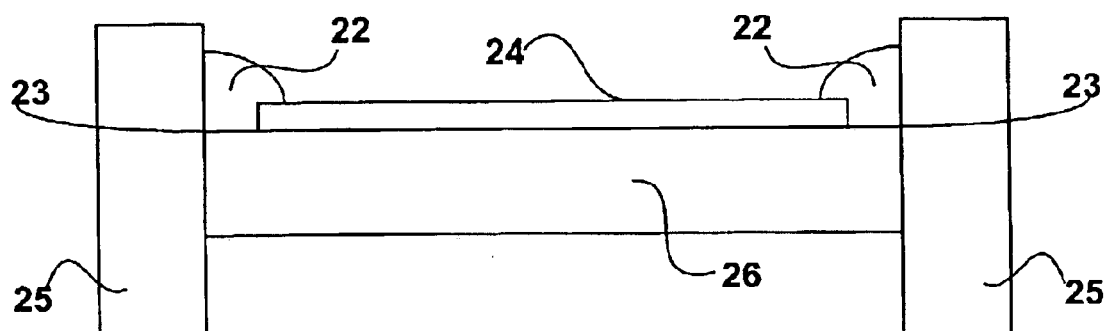
Figure 17:
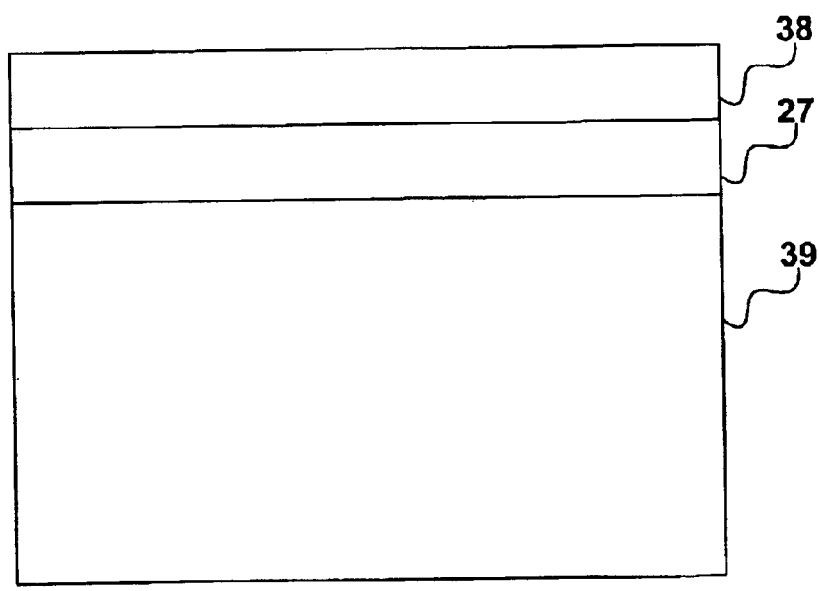
Figure 18:
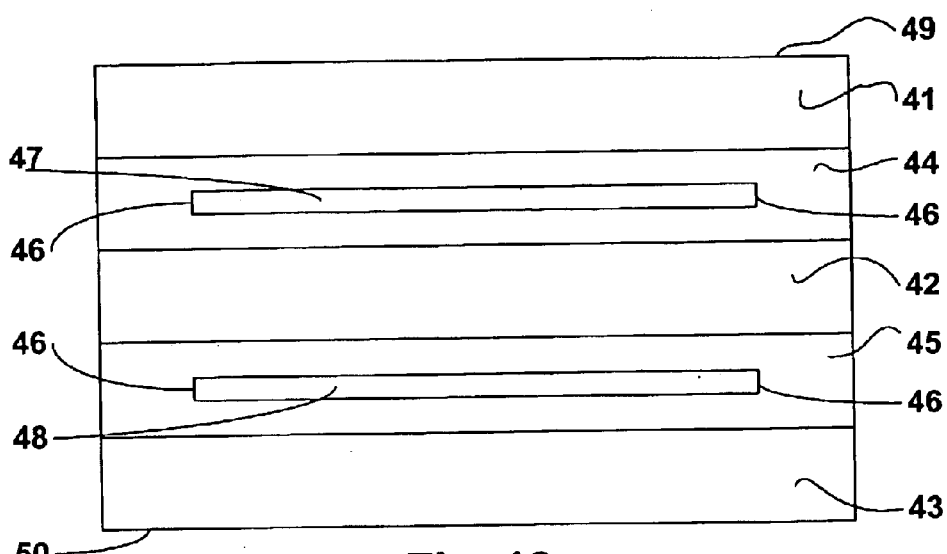
Figure 19:
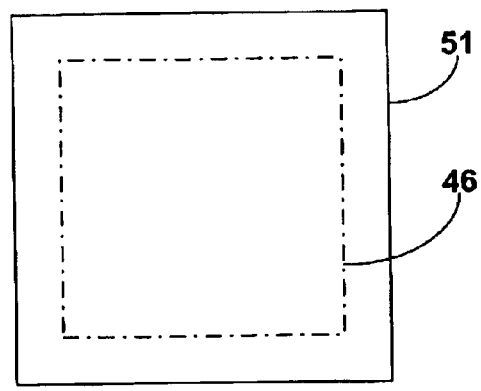
Figure 20:
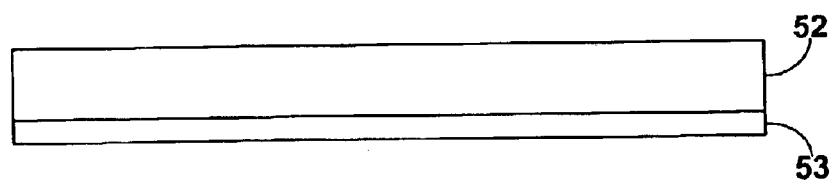
Figure 21:
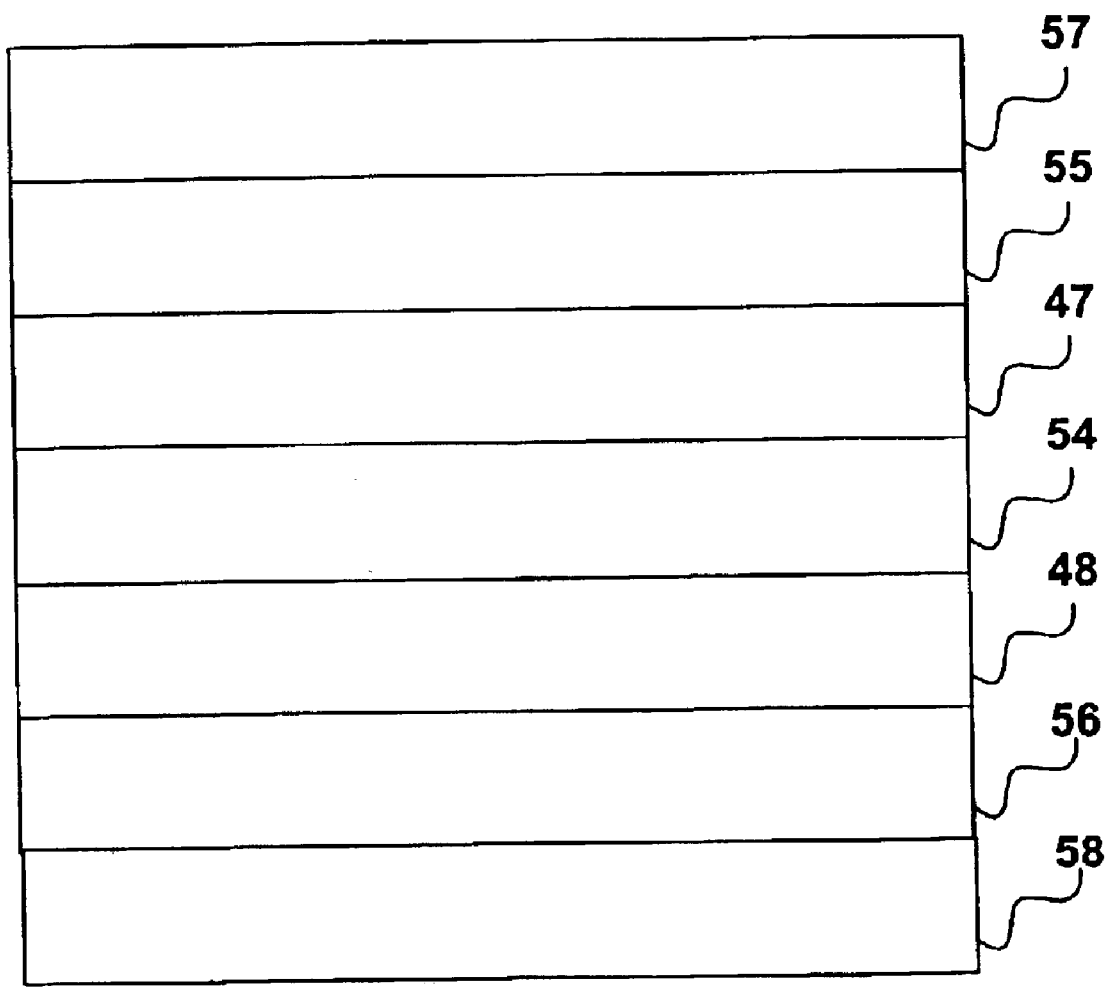

IN THE DRAWINGS:

FIG. 1 is a graph depicting light transmission properties of a yellow filter used in embodiments of the present invention;

FIG. 2 is a graph that shows the light transmission properties (wavelengths from 300–400 nm) of a light filter that may be used in embodiments invention;

FIG. 3 is a cross-sectional view of a combination of a three light filters configuration connected to a substrate in accordance with an embodiment of the present invention;

FIG. 4 is a cross-sectional view of a filtering configuration having two of the light filters layers depicted FIG. 3 connected to one side of the substrate and the remaining third filter of FIG. 3 is attached to the other side of the substrate in accordance with an embodiment of the present invention;

FIG. 5 is a cross-sectional view depicting a double glazed window formed in accordance with an embodiment of the present invention;

FIG. 6 is a cross-sectional view of a plurality of light filters attached to conventional safety glass in accordance with an embodiment of the present invention;

FIG. 7 is a cross-sectional view depicting a combination of light filters connected to a flexible transparent substrate in accordance with another embodiment of the present invention;

FIG. 8 is a cross-sectional view depicting multiple light filters connected to a transparent plastic sheet that, in turn, is adhered to a window glass in accordance with an embodiment of the present invention;

FIG. 9 is a cross-sectional view depicting the use of a sealant to cover any gaps between the edge of a flexible sheet of a filter of the present invention and a window frame, in accordance with an embodiment of the present invention;

FIGS. 10–16 are cross-sectional views in accordance with other particular embodiments of the present invention;

FIG. 17 is a cross-sectional view of a temporary release liner employed in embodiments of the present invention;

FIG. 18 is a cross-sectional view of a filter combination embedded within PVB layers that are interposed between multiple glass layers in accordance with an embodiment of the present invention;

FIG. 19 is a top view of the configuration depicted in FIG. 18;

FIG. 20 is a cross-sectional view of a filter combination having a glass-fragmentation safety shield layers in accordance with an embodiment of the present invention; and FIG. 21 is a cross-sectional view of two distinct, separated combinations filter layers in accordance with an embodiment of the present invention.

DETAILED DESCRIPTION OF THE PREFERRED EMBODIMENT

Reference will now be made in detail to embodiments of the present invention, examples of that are illustrated in the accompanying drawings.

In one embodiment, the system and methods include a combination film illustrated in FIG. 3 consisting of a first layer 1 that is a standard yellow film layer having the wavelength transmission properties shown in FIG. 1 formed on a substrate 4 such as glass or acrylic; a second layer 2 that is a film layer having the wavelength transmission properties of FIG. 2 formed on the first layer; and a third film layer 3, having the electromagnetic filtering properties of the XIR-70 film shown in Table 1 below and an IR transmission at wavelengths between 780 nm and 2500 nm of no more than 50%, and preferably of less than 20%, and more preferably of about 15%, formed on the second layer. A film having the wavelength transmission properties shown in FIG. 1 is available from, for example, CPFilms as CPFilms Yellow Q2186 Film. An example of a film having the transmission properties of FIG. 2 is museum-grade film manufactured by FTI Sun-Gard. An example of the third layer is the XIR 70 Film manufactured by Southwall Technologies. XIR 70 film is a well-known component of a glass tint used in original equipment laminated automotive glass. Table 1 shows the characteristics of this type of tinted glass and, more particularly, Table 1 shows the properties of XIR 70 film that is an example of the third layer of the present invention.

TABLE 1

| Product/ Glass Type | Unit Thickness Si | Visible Light Transmittance (Tvis) % | Visible Reflectance Exterior % | Total Solar Transmittance (Tsol) % | Solar Reflectance Exterior % | Relative Heat Gain Btu's/Hr/ Ft$^2$ | Ultraviolet Blockage % |
|---|---|---|---|---|---|---|---|
| Clear Glass | 4 mil | 90 | 9 | 81 | 8 | 220 | 30 |
| Standard Auto Green Tint | 4 mil | 81 | 8 | 56 | 6 | 171 | 55 |
| Spectrally Absorbing Green | 4 mil | 74 | 7 | 44 | 5 | 150 | 70 |

TABLE 1-continued

| Product/ Glass Type | Unit Thickness Si | Visible Light Transmittance (Tvis) % | Visible Reflectance Exterior % | Total Solar Transmittance (Tsol) % | Solar Reflectance Exterior % | Relative Heat Gain Btu's/Hr/ Ft² | Ultraviolet Blockage % |
|---|---|---|---|---|---|---|---|
| XIR 70 | 5 mil | 70 | 9 | 46 | 22 | 117 | >99 |
| XIR 75 | 5 mil | 75 | 11 | 52 | 23 | 135 | >99 |

Note: XIR Glass construction is two plies of 2.1 mil clear glass with XIR-pvb interlayer.

Glass or a flexible transparent sheet having the first, second and third layers thereon, when used in the system and methods of the present invention is capable of at least 99% light rejection at up to at least 450 nanometers. In an alternative embodiment, the sequence of the first, second, and third film layers may be varied. Also, any of the film layers may be substituted by other films having similar transmission properties. In addition, the film layers may be overlaid or combined.

The first film layer noted above (e.g., the film having the properties shown in FIG. 1) absorbs selective wavelengths as illustrated in the graph, wherein the vertical axis on the right side of the FIG. 1 depicts the percent transmission while the vertical axis on the left side of the FIG. 1 depicts the corresponding decimal equivalent. The first film layer has the benefits of blocking or attenuating various types of electromagnetic energy. In particular, FIG. 1 illustrates how this particular yellow film filter has light transmission at wavelengths below 450 nm of less than 50%. In fact, the yellow film filter is substantially intransitive between 400 and 450 nm. Thus, the present invention employs a yellow film that prevents various types of known surveillance.

The second film layer (e.g., the film whose properties are shown in FIG. 2) exhibits an increasing percentage of light transmission beginning at about 380 nanometers as shown in FIG. 2. In one embodiment, the second film layer exhibits light transmission percentages for various wavelengths as shown below in Table 2.

TABLE 2

| Wavelength | Light Transmission |
|---|---|
| 320 nm | 0.1–0.3% |
| 380 nm | 0.4–0.5% |
| 400 nm | 3–5% |
| 550 nm | 85–88% |

The film having the properties shown in FIG. 2 and in Table 2 may have a percent light transmission at 320 nm and 380 nm that is less than 1% of the transmission at 550 nm. In addition, the percent light transmission at 480 nm may be less than 50% of the transmission at 550 nm.

The third film layer (e.g., the film having similar properties to the XIR-70 film described in Table 1) has an IR transmission at wavelengths between 780 nm and 2500 nm of no more than 50%, preferably less than 20%, and more preferably about 15%. An example of the third film layer may be about 2 mils thick; have a visible light transmittance of about 60–70%; a visible reflectance (exterior) of about 9%; a total solar transmittance of about 46%; and a solar reflectance (exterior) of about 22%. The surface resistance of the exemplary XIR film used in this invention is in the neighborhood of 6.0 ohms/square.

The embodiment of the invention that uses the first, second, and third film layers may produce a yellow cast due to the inclusion of the yellow film layer. This yellow cast is seen when looking from the inside toward the outside and is similar to the lighting in a shooting range or looking through night vision goggles. The exterior reflected color of the invention is not restricted, however, as a wide range of metallized products may be used in the mix to change the exterior appearance of the film. Testing has shown that different metallized versions of the invention can be made, and with the insertion of yellow, different colorations can be achieved.

As noted above, the light filters may be sequenced or distributed in any manner. FIG. 3 illustrates an embodiment wherein film layers 1, 2 and 3 (that are light filters) are connected to one side of substrate 4. FIG. 4 illustrates an alternative embodiment wherein film layers 1 and 2 are connected to one side of the substrate 4 while film layer 3 is connected to the other side of substrate 4. In a further embodiment illustrated in FIG. 5, the window glazing that serves as the substrate comprises two separate spaced-apart glass sheets 5 and 6. Film layers 1 and 2 are attached to either side of glass sheet 5 while film layer 3 is attached to glass sheet 6. Film layer 3 in FIG. 5 may be attached to either side of sheet 6. In a further embodiment illustrated in FIG. 6, the substrate upon that the films are connected may be a standard safety glass that includes PVB interlayer 7 interposed between glass sheets 5 and 6. Film layers 3 and 2 are connected to glass sheet 5 and film layer 1 is connected to glass sheet 6. It is also possible to connect any or all of film layers 1, 2 and 3 to PVB interlayer 7.

Another filter that may be used in the various combinations of filters in the present invention is a UV screening film. The UV screening film is advantageously a weatherable PET UV screening film, is preferably a PET film with UV absorbers dyed into it in an amount to produce at least 2.4 optical density (OD) absorbance. A suitable PET film includes the film manufactured by the dyeing process described in U.S. Pat. No. 6,221,112. One or more of the UV screening films may be used in the present invention. Also, instead of using a UV screening film, UV absorbers may be incorporated into another layer or on a component of window glazing.

The conventional museum grade film described-above for use in second generally comprises the combination of two layers of the aforementioned UV screening film. Thus, the museum grade film may be substituted for two UV screening films in the overall combination of filters.

As also noted above, the light filters may be distributed on more than one surface. For example, film layers 2 and 3 may be connected to a window while film layer 1 is connected to a computer screen or other stand-alone device. Alternatively, film layers 1 and 2 may be connected to a computer screen or other stand-alone device, while film layer 3 is connected to a window.

Moreover, it is not essential for the combination of filters to be attached to a surface. For example, film layers 1, 2, and/or 3 may be configured to form a separate covering that may be soft and pliable, such as a bag. In this embodiment, the combination of filters may be placed over computer screens or monitors, personal digital assistants, or other stand-alone devices, may be easily used and removed, and preferably may be disposable. It should be noted that the soft, pliable covering may be configured so that it includes only some of the filters, for example, filters 2 and 3, while filter 1 is directly applied to the screen or monitor. Thus, the soft, pliable covering will work in conjunction with a filter applied to a stand-alone device. In an alternate embodiment, film layers 1, 2, and/or 3 may be configured as a containment system, such as in the form of a tent or sheet, thereby covering an entire workstation. It should be noted that the containment system may also be configured so that it includes only some of filters, for example, filters 2 and 3, while filter 1 is directly applied to the screen or monitor. Thus, the containment system, like the soft, pliable covering described above, will work in conjunction with a filter applied to a stand-alone device. In a further embodiment, film layers 1, 2, and/or 3 may be configured to form part of a containment system, such as a window of the tent or sheet.

In an alternative embodiment, film layers 1, 2, and/or 3 may be substituted by corresponding filters that meet the minimum filtering criteria of film layers 1, 2, and/or 3. One of the light filters of the combination may be a metal or a metal stack comprising an electrically conductive metal layer which is optionally interposed between two nickel/chrome alloy layers. The electrically conductive metal layer preferably has at least the electrical conductivity of aluminum or higher, and more preferably has at least the electrical conductivity of copper or higher. Most preferably the electrically conductive metal is copper. The nickel chrome alloy is utilized to provide corrosion protection for the electrically conductive metal and may be omitted if the anti-corrosion benefit is not desired. Other anti-corrosion metals or metal alloys such as stainless steel may be substituted for one or both the nickel/chrome alloy layers. It is also possible to provide the nickel/chrome alloy or an anti-corrosion metal or metal alloy on only one side of the electrically conductive metal layer, such as a Hastelloy alloy or an Inconel alloy that are well known to those skilled in the art. An example of a Hastelloy alloy includes Hastelloy C276 that has the characteristics shown in Table 3.

TABLE 3

Chemical composition, percent by weight: C, 0.02[a], Mn, 1.00[a]; Fe, 5.50; S, 0.03[a]; Si, 0.05[a]; Cr, 15.50; Ni, balance; Co, 2.50[a]; Mo, 16.00; W, 3.75; V, 0.35[a]; P, 0.03[a] Maximum
Physical constants and thermal properties Density, lb/in.$^3$: 0.321
Coefficient of thermal expansion, (70–200° F.) in./in./° F. × $10^{-6}$: 6.2
Modus of elasticity, psi: tension, 29.8 × $10^6$
Melting range, ° F.: 2,415–2,500 Specific heat, Btu/lb/° F., 70° F.: 0.102
Thermal conductivity, Btu/ft2/hr/in./° F., 70° F.: 69
Electrical resistivity, ohms/cmil/ft, 70° F.: 779
Heat Treatments
Solution heat treat 2,100° F., rapid quench.

| | TENSILE PROPERTIES Solution Treated 2,100° F., Water Quench | | | |
|---|---|---|---|---|
| Temperature, ° F. | T.S., psi | Y.S., psi, 0.2% offset | Elong., in 2 in. % | Hardness, Brinell |
| 70 | 113,500 | 52,000 | 70 | — |
| 400 | 101,700 | 44,100 | 71 | — |
| 600 | 95,100 | 39,100 | 71 | — |
| 800 | 93,800 | 33,500 | 75 | — |
| 1,000 | 89,600 | 31,700 | 74 | — |
| 1,200 | 86,900 | 32,900 | 73 | — |
| 1,400 | 80,700 | 30,900 | 78 | — |
| 1,600 | 63,500 | 29,900 | 92 | — |
| 1,800 | 39,000 | 27,000 | 127 | — |

| | Rupture Strength, 1,000 hr Solution Treated, 2,100° F., Water Quench | | |
|---|---|---|---|
| Test Temperature, ° F. | Strength, psi | Elong., in 2 in., % | Reduction of area, % |
| 1,200 | 40,000 | — | — |
| 1,400 | 18,000 | — | — |
| 1,600 | 7,000 | — | — |
| 1,800 | 3,100 | — | — |

| | Impact Strength Solution Treated, 2,100° F., Water Quench | |
|---|---|---|
| Test temperature, ° F. | Type test | Strength, ft-lb |
| −320 | Charpy-V-notched | 181 |
| +70 | Charpy-V-notched | 238 |
| +392 | Charpy-V-notched | 239 |

An example of an Inconel alloy includes Inconel 600 that has the characteristics shown in Table 4.

TABLE 4

Chemical composition, percent by weight: C, 0.08; Mn, 0.5; Fe, 8.0; S, 0.008; Si, 0.25; Cr, 15 Ni, 76.0 Cu, 0.25; Ti, 0.35; Al, 0.25
Physical constants and thermal properties
Density, lb/in.$^3$: 0.304
Coefficient of thermal expansion, (70–200° F.) in./in./° F. × 10$^{-6}$: 7.4
Modulus of elasticity, psi: tension, 30 × 10$^6$; torsion, 11 × 10$^6$
Poisson's ratio: 0.29
Melting range, ° F.: 2,470–2,575
Specific heat, Btu/lb/° F., 70° F.: 0.106
Thermal conductivity, Btu/Ft$^2$/hr/in./° F., 70° F.: 1
Electrical resistivity, ohms/cmil/ft, 70° F.: 620
Curie temperature, ° F.: annealed, −192
Permeability (70° F., 200 Oe): annealed, 1.010
Heat treatments used in annealed condition, 1,850° F./30 min.

| | | Tensile Properties Hot Rolled | | |
|---|---|---|---|---|
| Temperature, ° F. | T.S., psi | Y.S., psi, 0.2% offset | Elong. in 2 in. % | Hardness, Brinell |
| 70 | 90,500 | 36,500 | 47 | — |
| 600 | 90,500 | 31,100 | 46 | — |
| 800 | 88,500 | 29,500 | 49 | — |
| 1,000 | 84,000 | 28,500 | 47 | — |
| 1,200 | 65,000 | 26,500 | 39 | — |
| 1,400 | 27,500 | 17,000 | 46 | — |
| 1,600 | 15,000 | 9,000 | 80 | — |
| 1,800 | 7,500 | 4,000 | 118 | — |

| | Rupture Strength, 1,000 hr Solution Annealed, 2,050° F./2 hr | | |
|---|---|---|---|
| Test Temperature, ° F. | Strength, psi | Elong., in 2 in., % | Reduction of area, % |
| 1,500 | 5,600 | — | — |
| 1,600 | 3,500 | — | — |
| 1,800 | 1,800 | — | — |
| 2,000 | 920 | — | — |

| | Creep Strength (Stress, psi, to Produce 1% Creep) Solution Annealed 2,050° F./2 hr. | |
|---|---|---|
| Test Temperature, ° F. | 10,000 hr | 100,000 hr |
| 1,300 | 5,000 | — |
| 1,500 | 3,200 | — |
| 1,600 | 2,000 | — |
| 1,700 | 1,100 | — |
| 1,800 | 560 | — |
| 2,000 | 270 | — |

| | Fatigue Strength Annealed | |
|---|---|---|
| Test temperature, ° F. | Stress, psi | Cycles to failure |
| 70 | 39,000 | 10$^8$ |

| Test temperature, ° F. | Type test | Strength, ft-lb |
|---|---|---|
| +70 | Charpy-V-notched | 180 |
| 800 | Charpy-V-notched | 187 |
| 1,000 | Charpy-V-notched | 160 |

Another light filter that may be used in this invention includes a heat reflecting film. The heat reflecting film may be a sputtered metal/oxide stack described in U.S. Pat. No. 6,007,901 on a polyester (PET) film with UV absorbers dyed into it at 2.4 absorbance manufactured by the dyeing process described in U.S. Pat. No. 6,221,112. The disclosures of the aforementioned U.S. Pat. Nos. 6,007,901 and 6,221,112 are incorporated herein by reference. Alternatively any of the heat reflecting metal/oxide stacks described herein may be coated onto any component of window glazing to thereby eliminate the need of a plastic film. In other words the metal/oxide stack may be deposited onto any component of window glazing (e.g., coated directly or indirectly onto the glass of window glazing) without first coating the metal/oxide stack onto a film (e.g. polyester film) and then adhering the metal/oxide coated film onto the window glazing. The aforementioned metal stack in combination with the sputtered metal/oxide stack produces a light filter that has the required characteristics of the XIR-70 film, and may therefore be substituted for the XIR-70 film.

Any of the heat reflecting films that are well known to those skilled in the art may be also used in this invention. Such heat reflecting films generally comprise multiple stacks of discrete layers that are deposited onto a substrate such as a plastic film or glass. Each stack has in sequence a thin film of dielectric material (e.g., metal oxide) and a heat reflecting metal such as silver, gold, copper or alloys thereof. Substantially transparent metal compounds (e.g., metal oxides such as indium tin oxide) may be used as the dielectric.

The heat reflecting film may comprise in sequence: (a) a substantially transparent substrate; (b) a first outer dielectric layer; (c) an infrared reflecting metal layer; (d) a color correcting metal layer comprising a metal different from the infrared reflecting metal layer; (e) a protective metal layer comprising a metal different from the infrared reflecting metal layer and different from the color correcting layer; (f) one or more subcomposite layers each comprising: (i) a subcomposite inner dielectric layer; (ii) a subcomposite infrared reflecting metal layer; (iii) a subcomposite color correcting metal layer comprising a metal different from the subcomposite infrared reflecting metal layer; and (iv) a subcomposite protective metal layer comprising a metal different from the subcomposite infrared reflecting metal layer and different from the subcomposite color correcting layer; and (g) a second outer dielectric layer.

The dielectric layers are typically indium oxide, indium zinc oxide, indium tin oxide or mixtures thereof. However other metal oxides may be substituted for the above-mentioned oxides. Suitable oxides for use as the dielectric layer include metal oxides having an index of refraction in the range of 1.7–2.6. The thickness of the outside dielectric layers is typically between about 0.15 quarter wave optical thickness and about 1 quarter wave optical thickness.

The infrared reflecting metal layers are typically silver, gold, copper or alloys thereof and are laid down in a thickness of between 7 nm and about 25 nm. The color correcting metal layers preferably have a refractive index between about 0.6 and about 4 and an extinction coefficient for light in the visible range between about 1.5 and about 7. The color-correcting metal layers most preferably consist essentially of indium.

The protective metal layers are made from a metal whose oxide is substantially-optically non-absorbing, such as aluminum, titanium, zirconium, niobium, hafnium, tantalum, tungsten and alloys thereof. The protective metal layers typically have a thickness between about 1 nm and about 5 nm.

The heat reflecting film may also be a composite comprising in sequence: (a) a substantially transparent substrate; (b) a first outer dielectric layer; (c) an infrared reflecting metal layer; (d) a color correcting metal layer comprising a metal different from the infrared reflecting metal layer; (e) a protective metal layer comprising a metal different from the infrared reflecting metal layer and different from the color correcting layer; (f) a second outer dielectric layer; and (g) a substantially transparent top layer comprising a substantially transparent glass or polymeric material.

The heat reflecting film may also be a composite comprising in sequence: (a) a substantially transparent substrate; (b) a first outer dielectric layer chosen from the group of dielectric materials consisting of indium oxide, indium zinc oxide, indium tin oxide and mixtures thereof; (c) an infrared reflecting metal layer comprising an alloy of silver and copper; (d) a color correcting metal layer consisting essentially of indium; (e) a protective metal layer comprising a metal whose oxide has a heat of formation less than (more negative than) −100,000 cal/gm mole at 25 degree C. and (f) a second outer dielectric layer chosen from the group of dielectric materials consisting of indium oxide, indium zinc oxide, indium tin oxide and mixtures thereof.

Preferably the various layers of the heat reflecting film are assembled so as to transmit between about 40% and about 80% of light within the visible spectrum (preferably 40–60%). It is also preferable that the composites of the heat reflecting film have reflectances of visible light less than 15%, typically between about 5% and 15%. Finally, it is preferable that the layers of the heat reflecting film be so assembled so that the composite transmits and reflects visible light in "neutral colors" or "slightly bluish or greenish" transmission colors. Transmissions that are neutral in color are generally transmit visible light in equal intensities throughout the visible spectrum. Light transmitted with a slightly bluish or slightly greenish tint is light whose components with wavelengths in the 380–580 nm range are slightly higher in intensity than other wavelengths.

According to one embodiment the heat reflecting film comprises in sequence:

(a) a substantially transparent first substrate;
(b) a first outer dielectric layer;
(c) an infrared reflecting metal layer;
(d) a color correcting metal layer comprising a metal different from the infrared reflecting metal layer;
(e) a protective metal layer comprising a metal different from the infrared reflecting metal layer and different from the color correcting layer;
(f) a subcomposite comprising:
  (i) a subcomposite inner dielectric layer;
  (ii) a subcomposite infrared reflecting metal layer;
  (iii) a subcomposite color correcting metal layer comprising a metal different from the subcomposite infrared reflecting metal layer; and
  (iv) a subcomposite protective metal layer comprising a metal different from the subcomposite infrared reflecting metal layer and different from the subcomposite color correcting layer;
(g) a second outer dielectric layer; and
(h) a substantially transparent second substrate;
wherein the heat reflective filter transmits 40–80% of light within the visible wavelengths (preferably 60–70%) and has a reflectance of less than 15%; and
wherein the color of both transmitted and reflected light from the heat reflecting fenestration product is either neutral or is slightly bluish or slightly greenish in color.

In another embodiment the heat reflecting composite comprises in sequence:

(a) substantially transparent first substrate;
(b) a first outer dielectric layer;
(c) an infrared reflecting metal layer comprising silver;
(d) a color correcting metal layer comprising a metal chosen from the group of metals consisting of chromium, cobalt, nickel, zinc, palladium, indium, tin, antimony, platinum, bismuth and alloys thereof;
(e) a protective metal layer comprising a metal chosen from the group of metals consisting of aluminum, titanium, zirconium, niobium, hafnium, tantalum, tungsten and alloys thereof;
(f) a subcomposite comprising:
  (i) a subcomposite inner dielectric layer;
  (ii) a subcomposite infrared reflecting metal layer comprising silver;

(iii) a subcomposite color correcting metal layer comprising a metal chosen from the group of metals consisting of chromium, cobalt, nickel, zinc, palladium, indium, tin, antimony, platinum, bismuth and alloys thereof;

(iv) a subcomposite protective metal layer comprising a metal chosen from the group of metals consisting of aluminum, titanium, zirconium, niobium, hafnium, tantalum, tungsten and alloys thereof;

(g) a second outer dielectric layer; and (h) a substantially transparent second substrate disposed contiguous with the second outer dielectric layer;

wherein the dielectric layers are chosen from the group of dielectric materials consisting of indium oxide, indium zinc oxide, indium tin oxide and mixtures thereof;

wherein the heat reflective filter transmits 40–60% of light within the visible wavelengths and has a reflectance of less than 15%;

wherein the color of both transmitted and reflected light from the heat reflect substrate is either neutral, or is blue or green in color; and wherein the composite transmits less than about 7% of the infrared energy in light having a wavelength greater than about 1500 nm.

In another embodiment the heat reflecting film is a composite comprising in sequence:

(a) a substantially transparent substrate;

(b) a first outer dielectric layer;

(c) an infrared reflecting metal layer;

(d) a color correcting metal layer comprising a metal different from the infrared reflecting metal layer;

(e) a protective metal layer comprising a metal different from the infrared reflecting metal layer and different from the color correcting layer;

(f) a subcomposite comprising:
(i) a subcomposite, inner dielectric layer;
(ii) a subcomposite infrared reflecting metal layer;
(iii) a subcomposite color correcting metal layer comprising a metal different from the subcomposite infrared reflecting metal layer; and
(iv) a subcomposite protective metal layer comprising a metal different from the subcomposite infrared reflecting metal layer and different from the subcomposite color correcting layer; and (g) a second outer dielectric layer;

wherein the combined thickness $T_1$ of the infrared reflecting metal layer, the color correcting metal layer and the protecting metal layer is different than the combined thickness $T_2$ of the subcomposite infrared reflecting metal layer, the subcomposite color correcting metal layer and the subcomposite protecting metal layer, and wherein $T_1$ and $T_2$ are in a ratio to one another of about 1.2.

A preferred heat reflector film for use in this invention is made by sputter coating the following sequence of layers onto a PET film with UV absorbers dyed into it at 2.4 absorbance.

a first layer of indium tin oxide about 30 nm thick coated on said PET film, a first layer of silver/copper alloy about 9 nm thick (92.5 wt. % Ag and 7.5 wt. % Cu) coated on said first layer of indium tin oxide, a layer of indium metal about 3 nm thick coated on said first silver/copper alloy, a first layer of titanium metal about 1 nm thick coated on said indium, a layer of indium tin oxide about 80 nm thick coated on said titanium, a second 9 nm layer of silver/copper alloy (92.5 wt. % Ag and 7.5 wt. % Cu) coated on said indium tin oxide, a layer of indium metal about 2 nm thick coated on said second silver/copper alloy, a second layer of titanium metal about 1 nm thick coated on said 2 nm layer of indium, and a second layer of indium tin oxide about 30 nm thick coated on said second layer of titanium.

The layer of titanium functions as a protective sacrificial layer that prevents oxidation of the indium metal layer during the sputter coating of the indium tin oxide layer.

Alternatively the PET film may be eliminated and the above sequence of layers may be coated onto a component (e.g., glass) of window glazing.

The above described heat reflector has a sheet resistance that is less than 17 ohms/square.

As described above, some embodiments of the invention utilize the metal or metal stack which comprises an electrically conductive metal such as copper optionally interposed between the two nickel/chrome layers as well as the heat reflecting sputtered metal/oxide stack. Alternatively, one or more of the above-described filters may be replaced by a filter having the electromagnetic filtering properties of the XIR-70 film or the XIR-75 FILM described above in Table 1. In particular, the XIR-70 and XIR-75 films have an IR transmission at wavelengths between 780 nm and 2500 nm of no more than 50%, and preferably of less than 20%, and more preferably of about 15%. XIR-70 and XIR 75 films are commercially available from Southwall Technologies. XIR-70 film and the XIR-75 films are well known components of glass tint used in original tinted glass and, more particularly, Table 1 shows the properties of XIR-70 film which may be used in the present invention as part of the overall combination of filters. An example of the XIR film may be about 2 mil thick; have a visible light transmittance of about 60–70%, a visible reflectance (exterior) of about 9%; a total solar transmittance of about 46%; and a solar reflectance (exterior) of about 22%. The surface resistance of an exemplary XIR film used in this invention is about 6.0 ohms/square.

Preferably the XIR-70 or XIR-75 film further includes an electrically conductive metal layer (e.g., copper or silver) to produce a sheet resistance which is less than 4 ohms/square.

In a preferred embodiment, improved anti-surveillance devices and system may be obtained by replacing the aforementioned metal stack (nickel chrome alloy/copper/nickel chrome alloy) and the heat reflecting metal/oxide stack with a high visible light transmission/low resistance (less than 4 ohms/square) filter in the combination of filters.

Most broadly, the high visible light transmission/low resistance (less than 4 ohms/square) filter is a stack that is either an IR reflecting metal layer sandwiched between two dielectric layers or a dielectric layer sandwiched between two IR reflecting metal layers. The above-noted stack is coated onto a component of window glazing or onto a transparent plastic sheet such as PET.

The dielectric of each of the dielectric layers in the aforementioned stack has an index of refraction in the range of about 1.35 to about 2.6. Preferably the dielectric is a metal oxide dielectric having an index of refraction in the range of about 1.7 to about 2.6.

The above-described high visible light transmission/low resistance (less than 4 ohms/square) filter is preferably a Ag/Ti or Ag/Au stack or other functionally equivalent stacks as described below.

The Ag/Ti stack may be a multilayered structure containing the following sequence of layers coated (preferably sputter coated) onto a component of window glazing or onto a transparent plastic sheet which is preferably polyethylene terephthalate (PET):

. a layer of indium tin oxide which is preferably 30 nm thick;
2. a silver IR reflecting layer which is preferably about 9 nm thick;
3. a protective sacrificial layer of titanium about 1 nm thick;
4. a layer of indium tin oxide which is preferably about 70 nm thick;
5. a silver IR reflecting layer preferably about 9 nm thick;
6. a protective sacrificial layer of titanium preferably about 1 nm thick;
7. an indium tin oxide layer preferably about 70 nm thick;
8. a silver IR reflecting layer preferably about 9 nm thick;
9. a protective sacrificial layer of titanium, preferably about 1 nm thick; and
10. a layer of indium tin oxide preferably about 30 nm thick.

The indium tin oxide layers in the Ag/Ti stack has an index of refraction of about 2.0. The thickness of the silver layers may be adjusted to achieve the desired ohms per square for the above-described multilayered structure. The above-described multi-layered structure has a sheet resistance that is less than 4 ohms per square.

Preferably the Ag/Ti stack has a sheet resistance which is less than 2.5 ohms/square. An Ag/Ti stack having a sheet resistance less than 2.5 ohms/square is exemplified by a stack containing the following sequence of layers sputtered onto a component of window glazing or onto a transparent plastic sheet which is preferably PET:

1. a coating of indium tin oxide about 30 nm thick;
2. a silver IR reflecting layer which is about 11 nm thick;
3. a protective sacrificial layer of titanium about 1 nm thick;
4. a layer of indium tin oxide about 75 nm thick;
5. a silver IR reflecting layer which is about 13 nm thick;
6. a protective sacrificial layer of titanium about 1 nm thick;
7. an indium tin oxide layer about 70 nm thick;
8. a silver IR reflecting layer about 11 nm thick;
9. a protective sacrificial layer of titanium about 1 nm thick; and
10. a layer of indium tin oxide which is about 30 nm thick.

The Ag/Ti stack having the lower sheet resistance of less than 2.5 ohms per square provides lower electrical resistance, higher IR rejection at the 800 and above nm range with a visible light transmission of 70%. Using the Ag/Ti stack having a sheet resistance which is less than 2.5 ohms/square, results in a filter which is less dark, more conductive and which provides greater IR rejection compared to the filter containing the nickel-chrome alloy/copper/nickel-chrome alloy layered structure with the metal/oxide heat reflecting film.

The protective sacrificial layer of titanium will be oxidized to $TiO_2$ when the indium tin oxide layers are deposited to thereby prevent the indium tin oxide layer from oxidizing the silver.

The layers used in the Ag/Ti and Ag/Au stack may be sputter coated using any conventional sputter coating technique. For example the indium tin oxide layer in the Ag/Ti sputtered stack may be sputtered in an argon and oxygen environment and the metals in the Ag/Ti stack may be deposited in a pure argon environment.

The above described Ag/Ti stack has a visible light transmission (VLT) of about 65–69% T550 (i.e. percentage of VLT measured using light having a wavelength of 550 nm).

The Ag/Au stack is also a multilayered structure coated (preferably sputter coated) onto a component of window glazing or onto a clear plastic sheet such as PET and preferably contains the following sequence of layers:

1. A layer of indium tin oxide (ITO) preferably about 30 nm thick;
2. a silver IR reflecting layer preferably about 9 nm thick;
3. a layer of gold about 1 nm thick;
4. an ITO layer preferably about 70 nm thick;
5. a silver IR reflecting layer preferably about 9 nm thick;
6. a layer of gold preferably about 1 nm thick;
7. an ITO layer preferably about 70 nm thick;
8. a silver IR reflecting layer preferably about 9 nm thick;
9. a gold layer preferably about 1 nm thick; and
10. an ITO layer preferably about 30 nm thick.

The ITO layers in the above-described Ag/Au stack have a refractive index of about 2.0. The thickness of the silver layers may be varied to regulate the ohms per square for the above-described multilayered structure. The above-described multilayered structure has a sheet resistance that is less than 4 ohms per square.

The gold layers in the Ag/Au stack serve as a protective layer for the silver, but unlike the corresponding Ti layers in the Ag/Ti stack, the gold layers are not oxidized.

The ITO may be sputtered in an argon and oxygen environment while the metals may be deposited in a pure argon environment.

In both of the above described Ag/Ti and Ag/Au stacks, the first ITO layer is first sputter coated onto a component of window glazing or onto the clear plastic sheet and the remaining layers are sequentially sputter coated in the order indicated above.

In both of the above described Ag/Ti and Ag/Au stacks, any or all of the indium tin oxide layers may be substituted with any dielectric layer having an index of refraction in the range of about 1.35 to about 2.6, preferably a metal oxide dielectric having an index of refraction in the range of about 1.7 to about 2.6.

A third light filter that may be used in the present invention includes a 1.0 mil polyester (PET) film dyed yellow. This type of film is commercially available as Q2186 dark yellow. The film is manufactured by impregnating the polyester film with, for example, solvent dispersed yellow dye 54 or 64. The impregnation takes place utilizing 7 gms/liter loading. The film may be dyed using the process described in U.S. Pat. Nos. 3,943,105, 4,047,889, 4,055,971 or 4,115,054, the disclosures of that are incorporated herein by reference. The Q2186 dark yellow film is made with yellow dye 54 and may be the same as the film of first layer 1 shown in FIG. 3. Instead of using a yellow-dyed film, the yellow dye may be used as a coating on a window or computer screen or on any substrate or other film or sheet used in this invention.

The above-described light filters used in this embodiment may be connected to a substrate polyester film to produce the transparent flexible sheet as illustrated in FIG. 7.

Turning to FIG. 7, this embodiment of the invention includes layers 9–19 and optionally includes release liner layer 8 that is removed prior to application to the glass of a window, or to a screen, monitor, or other stand-alone device.

Release liner 8 may be a 1 mil polyester (PET) film with a silicone release coating on it. Any suitable silicone release coating may be used, such as a tin catalyzed silicone release that has about 10 grams per inch release characteristic. Non-silicone release formulations may be substituted for the silicone release layer.

Layer 9 may be a conventional pressure sensitive adhesive that holds the flexible sheet of FIG. 7 to the glass. An example of a pressure sensitive adhesive includes an acrylic solvent-based pressure sensitive adhesive that is applied at about 10 lbs/ream coat weight. The pressure sensitive adhesive of layer 9 may include 4% by weight of a UV absorber such as a benzotriazole UV absorber. Such a pressure sensitive adhesive is commercially available as National Starch 80-1057. Other adhesives or adhesive types may be substituted for the PSA adhesive as can other types of UV absorbers. It should be appreciated by one of ordinary skill in the art that these UV absorbers function as stabilizers, and may be added to the present invention to protect the adhesive from deterioration (e.g., deterioration caused by sunlight). These stabilizers, however, are not required to practice the invention.

Layer 10 may be a 0.5 mil clear weatherable film. An example of layer 10 includes a polyester (PET) film with UV absorbers dyed into it in sufficient amounts to produce at 2.4 optical density absorbance. A suitable polyester film for layer 10 includes the film manufactured by the dyeing process described in above-cited U.S. Pat. No. 6,221,112. Other films with similar UV screening capability may be substituted for the above-described film used in layer 10.

Layer 11 may be a laminating adhesive that is used to laminate the layers together. A useful laminating adhesive includes any conventional polyester adhesive with an isocyanate cross-linker added thereto. An example of such a laminating adhesive is Rohm and Haas's Adcote 76R36 adhesive with catalyst 9H1H. The adhesive may be applied at 1–1.5 lbs/ream coat weight. Other laminating adhesives may be substituted for the above-noted polyester type adhesive.

Layer 12 may be a 1.0 mil polyester (PET) film with sputtered heat reflecting, conductive metal stack coating made up of a copper layer interposed between two anti-corrosive nickel/chrome alloy layers. Layer 12 has a visible light transmission of about 35%. The nickel/chrome alloy layers may include Hastelloy C276 or Inconel 600. Specific examples of Hastelloy C276 and Inconel 600 are described below.

Hastelloy C276 having the following mechanical properties: UTI tensil psi: 106,000; yield psi: 43,000; elong. % 71.0; and having the following chemical analysis:

| Hastelloy C 276 | |
|---|---|
| Element | % by weight |
| C | .004 |
| Fe | 5.31 |
| Mo | 15.42 |
| Mn | 0.48 |
| Co | 1.70 |
| Cr | 15.40 |
| Si | .02 |

| -continued | |
|---|---|
| Hastelloy C 276 | |
| Element | % by weight |
| S | .004 |
| P | .005 |
| W | 3.39 |
| V | 0.16 |
| Ni | Balance |

Inconel 600 having the following mechanical properties: UTI tensil psi: 139,500; yield psi 60,900; elong. % 44.0; hardness: Rb85; and having the following chemical analysis:

| INCONEL 600 | |
|---|---|
| element | % by weight |
| C | .08 |
| Fe | 8.38 |
| Ti | 0.25 |
| Mn | 0.21 |
| Cu | 0.20 |
| Co | 0.05 |
| Cr | 15.71 |
| Si | 0.30 |
| S | <.001 |
| Al | 0.28 |
| P | 0.01 |
| Ni | 74.45 |
| Nb + Ta | 0.08 |

Layer 13 may be a laminating adhesive. The amount and type of laminating adhesive of layer 13 may be the same as the amount and type of laminating adhesive used in layer 11.

Layer 14 may be a heat reflecting film. The heat reflecting film of layer 14 may include a sputtered metal/oxide stack (described in U.S. Pat. No. 6,007,901) on a 1.0 mil clear, weatherable polyester (PET) film. The polyester film has UV absorbers dyed into it in sufficient amounts to produce at 2.4 optical density absorbance. The film may be dyed using the dyeing process described in U.S. Pat. No. 6,221,112. Other films with UV screening capability may be used in place of the aforementioned UV screening film.

Layer 15 may be a laminating adhesive and may be the same as layers 11 and 13.

Layer 16 may be a 1.0 mil polyester (PET) film dyed yellow. An example of this film is known commercially as Q2186 dark yellow film. It is made by impregnating the polyester film with solvent dispersed yellow dye 54 or 64 at 7 grams/liter loading. The dyed polyester film is made by the procedures prescribed in U.S. Pat. Nos. 3,943,105; 4,047,889; 4,055,971 or 4,115,054.

Layer 17 may be a pressure sensitive adhesive. A suitable acrylic pressure sensitive adhesive includes Solutia's Gelva 263 that includes 8% by weight of a benzophenone type UV absorber. The pressure sensitive adhesive is coated at a rate of 4 lbs/ream coat weight.

Layer 18 may include a 7 mil polyester film that is utilized to provide a safety characteristic so that sharp glass fragments do not become dangerous projectiles when the glass breaks. Other thicknesses and/or types of films could be used.

Lastly, layer 19 may be a conventional hardcoat layer that is approximately 1.0–2.0 microns thick. A suitable hardcoat composition may include the hardcoat described in U.S. Pat. No. 4,557,980; the disclosure of that is incorporated herein by reference.

The museum-grade film that may be utilized as one of the filters of this invention includes a combination of filters comprising the dyed polyester film of layer 14 and the dyed polyester film of layer 10. Thus, the combination of these two dyed films used in the embodiments shown in FIGS. 7 and 8 is a functional equivalent of the museum-grade film, and may be used as a substitute therefor.

The above-described film illustrated in FIG. 7 has numerous properties including UV, visible, IR, EMI and RFI shielding capability and has a safety characteristic that prevents flying glass injuries due to layer 18.

Turning to FIG. 8, this embodiment of the invention results from removing release liner 8 from the flexible sheet illustrated in FIG. 7, thereby allowing the remaining layers 9–19 to be attached to the glass or other surface of a window or to a screen, monitor or other stand-alone device. FIG. 8 includes glass substrate 20 connected to the sheet illustrated in FIG. 7. When the present invention is applied to a window, the sheet of FIG. 7 may be adhered to the surface of the glass portion of the window that faces the inside of the room so that layer 18 can provide the desired safety feature described above. The side of the glass that faces the interior of the room is the side of the glass opposite to the side that receives sunlight from the direction shown by arrow 21 in FIG. 8.

The combination of light filters used in this invention has a shielding effectiveness of 22 db–40 db in the frequency range of 30 megahertz to 3 gigahertz, an IR transmission at wavelengths between 780 nm and 2500 nm of no more than 50%, preferably less than 20%, more preferably about 15%, and a light transmission that is less than 1%, and preferably less than 0.1%, for wavelengths of 450 nm and less. In one embodiment, the combination of light filters has the properties shown in Table 5.

TABLE 5

| | |
|---|---|
| Shielding Effectiveness in the frequency range of 30 megahertz–3 gigahertz | 22 db–40 db |
| Light transmission @ 450 nm | <1% |
| IR transmission | <50% |
| Emittance | 0.81 |
| % Solar Transmittance | 13 |
| % Solar Absorption | 59 |
| % Visible Transmittance | 25 |
| % Reflectance | 22 |
| % UV Transmittance | 0.01 |
| Solar Heat Gain Co-efficient | 0.30 |
| U Factor | 1.09 |
| Shading Coefficient | 0.34 |
| % Solar Energy Rejected | 70 |

It should be apparent to one of ordinary skill in the art, however that the properties shown in Table 5 may vary according to the filter layers employed, although shielding effectiveness, IR transmission, and light transmission properties should preferably remain constant.

In a further embodiment of the present invention, the combination of light filters has the properties shown in Table 6.

TABLE 6

| | |
|---|---|
| UV-transmission @ 380 nm | <0.1% |
| UV-Vis transmission from 380 to 450 nm | <2% |
| Visible transmission from 450–470 nm | <5% |
| Visible transmission from 470–780 nm | >1% |
| Near IR transmission at 900 nm | <10% |
| Near IR transmission at 1060 nm | <5% |
| Near IR transmission at 780 nm–1100 nm | <20% |

TABLE 6-continued

| | |
|---|---|
| Near IR transmission at 1150 nm | <5% |
| Near IR transmission at 1300 nm | <3% |
| Near IR transmission at 1550 nm | <2% |
| IR transmission at 1100–2500 nm | <5% |
| Conductivity | <7 ohms per square |
| Shielding effectiveness for 30 megahertz–3 gigahertz | 22 db–40 db |

A flexible transparent sheet made in accordance with this invention may also be used to minimize acoustic transmissions from a building by carefully applying the film to the window with an adhesive while making certain that no visible air bubbles are formed between the flexible sheet and the glazing of the window. The term "visible air bubbles" used herein means air bubbles that are visible without any magnification (e.g., visible to the naked eye). It has been discovered that when the transparent flexible sheet lies over an air bubble, the flexible sheet behaves like the diaphragm of a loudspeaker. This causes unwanted transmission of sound waves. Avoiding these bubbles minimizes the transmission of the sound waves through the window.

The combination of filters used in this invention should cover the surface area of the entire window glazing or otherwise should be configured to minimize the passage of the selected wavelengths therethrough unless the combination of filters is being used as a bag or tent. Thus, when the filters are applied to the glazing by adhering a flexible transparent sheet thereto, the flexible transparent sheet having the light filters thereon should be carefully positioned so that there are no gaps or unprotected areas on the glazing. In an embodiment, a single transparent flexible sheet having the filters thereon is employed to avoid seams between the edges of the flexible sheets on the glazing of a window. The avoidance of seams is beneficial because seams allow leakage of the wavelengths that the present invention seeks to avoid. This leakage through the seams occurs even when the edges of the flexible sheets are butted against one another and even when the edges overlap one another.

There is also a potential for leakage of the wavelengths around the periphery of the flexible sheet adjacent to the window frame. Turning to FIG. 9, leakage around the periphery may be minimized by applying an opaque electrically conductive sealant 22 around the periphery so that any gap 23 between the sheet 24 and the window frame 25 may be masked by the sealant. Thus, the sealant would cover any exposed portions of the glazing not covered by the sheet. FIG. 9 illustrates sheet 24 adhered to glazing 26 of a standard window. The sealant may be neutral curing to avoid unwanted chemical interaction with the sheet. An example of suitable sealant includes a silicone elastomer, such as Dow Corning 995 Silicone Structural Adhesive.

Preferably the flexible sheet is sized to avoid all gaps between sheet 24 and window frame 25. However it is not humanly possible to avoid all gaps between sheet 24 and window frame 25 due to small irregularities on the edges of sheet 24 and window frame 25. Thus sheet 24 should be sized so that the entire periphery of sheet 24 is in substantial contact with window frame 25. Substantial contact, as used herein, means as much contact as is humanly possible given the small irregularities on the edges of sheet 24 and window frame 25.

Another filter which may be used in the combination of filters is an IR absorbing filter which is a layer comprising an IR absorbing substance such as a layer of (lanthanum hexaboride) or other IR absorbing material such as antimony tin oxide. A preferred IR absorbing filter contains a combination of LaB$_6$ and antimony tin oxide. The IR absorbing material is preferably in the form of nanoparticles incorporated into a coating material such as adhesive or hardcoat material. Nanoparticles are particles having an average particle diameter of 200 nm or less, preferably less than 100 nm Examples of suitable IR absorbing filters include the IR absorbing filters described in United States published patent application no. US 2002/0090507 A1 and WO 02/41041 A2, the specifications of which are incorporated herein by reference.

The IR absorbing filters described in WO 02/41041 A2 and US 2002/0090507 A1 are optically active film composites which include a layer of resin binder having a thickness of less than 6 microns and a pencil hardness of at least 2H, preferably 3H, and include nanoparticles of at least one metallic compound absorbing light having a wavelength in the range of 1000–2500 nm and nanoparticles of a second metallic compound which is an inorganic compound and which absorbs light having a wavelength in the range of 700–1100 nm. Preferably the composite has a visible light transmission of at least 50% and a percent TSER of at least 35%, and more preferably has a visible light transmission of at least 70%. For a composite having a visible light transmission in the range of 50–60% the percent TSER may be between 50–65%.

Pencil hardness is measured according to ASTM D3363-92a.

Visible light transmission is calculated using CIE Standard Observer (CIE 1924 1931) and D65 Daylight.

The percent TSER is the percentage total solar energy rejection which is calculated from optical and heat rejection properties of coated film measured on a Varian Analytical Cary 5 Spectrophotometer in accordance with ASTM E903-82, the absorption and transmission data being analyzed using parameters described by Perry Moon in the *Journal of the Franklin Institute*, Volume 230, pp. 583–618 (1940).

Preferably one metallic compound is antimony tin oxide (ATO), indium tin oxide (ITO), or tin oxide. Preferably, this metallic compound is ATO, and the layer contains 30–60% by weight of ATO, preferably 50–60% by weight of ATO.

The second compound may be modified ITO as described in U.S. Pat. No. 5,807,511 and/or at least one of a metal hexaboride taken from the lanthanum series of the Periodic Table. The preferred hexaborides are La, Ce, Pr, Nd, Gb, Sm, and Eu with La being the most preferred option. The layer contains a maximum of 3% by weight of the second metallic compound, preferably less than 2% and more preferably between 0.5–2%.

The binder may be a thermoplastic resin such as an acrylic resin, a thermosetting resin such as an epoxy resin, an electron beam curing resin, or preferably a UV curable resin which may be an acrylate resin of the type disclosed in U.S. Pat. No. 4,557,980, or preferably a urethane acrylate resin.

The layer of resin binder may be coated to a transparent polymeric film substrate, preferably a polyester film which is more preferably PET film. The infrared blocking layer forms a hardcoat for the film substrate which is particularly advantageous and may cut out a further processing step during composite film manufacture. The PET film may be coated with an adhesive for fixing the film composite to the substrate used in this invention. The PET film and/or adhesive may include at least one UV radiation absorbing material to block out substantially all UV radiation to less than 1% weighted UV transmission. Weighted UV transmission is derived from measurements made in accordance with ASTM E-424 and as modified by the Association of Industrial Metallisers, Coaters & Laminators (AIMCAL). The above-mentioned IR absorption filter composites have low visible reflectivity of less than 10% and have excellent weatherability with no loss of absorption properties and holding color, after 1500 hours in a Weatherometer.

The IR absorbing filter may include a transparent substrate coated with a layer of resin having a thickness of less than 6 microns and which contains nanoparticles of ATO and nanoparticles of a second metallic compound which is an inorganic compound which absorbs light having a wavelength in the range of 700–1100 nm and a second transparent substrate located on the layer of resin so that the layer of resin is sandwiched between the two substrates.

In one implementation of the present invention, a combination of filters comprises the above-described low resistant sputtered stack (either the Ag/Ti or the Ag/Au stack or the stacks having the sequence: dielectric layer/IR reflecting metal layer/dielectric layer or the sequence: IR reflecting metal layer/dielectric layer/IR reflecting metal layer) in combination with one or two UV screening films, as depicted in FIG. 10.

Figure 10:
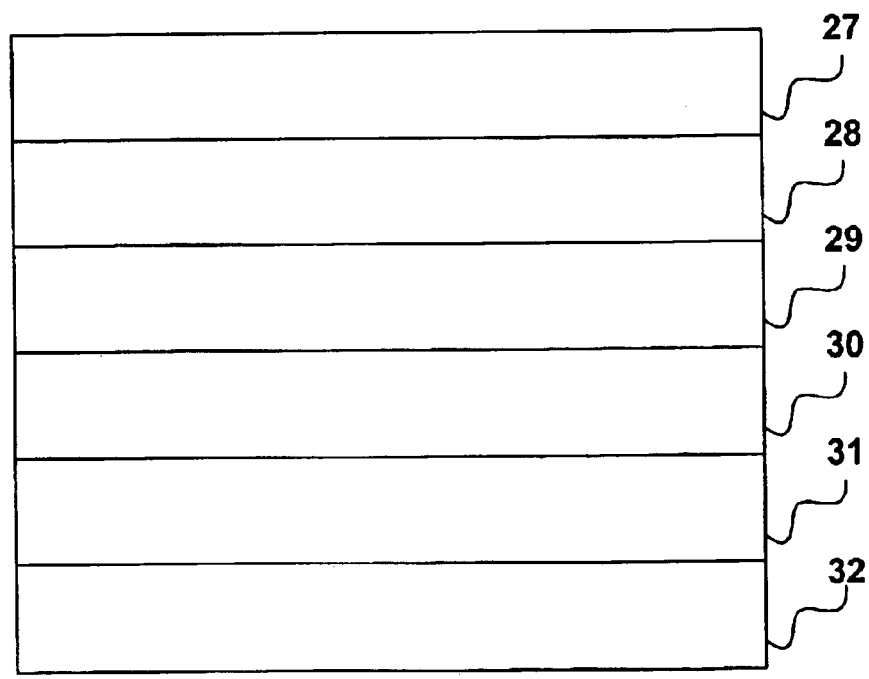

Turning to FIG. 10, the embodiment of the invention includes layers 27–32. Layer 27 is an adhesive for adhesively securing the multilayered structure to glazing of a window or to the display screen of a plasma monitor or other type of display screen.

Layer 28 is a UV screening film.

Layer 29 is either the Ag/Ti or the Ag/Au low resistance (less than 4 ohms/square) sputtered stack as described herein.

Layer 30 is a laminating adhesive.

Layer 31 is either a clear film or a UV screening film.

Layer 32 is an optional hardcoat layer.

The above-described combination offers high visible light transmission and high EMI/RFI shielding attenuation. Thus the first combination may be applied to glazing of a window using adhesive layer 27 or may be adhered to the display screen of a plasma monitor or other display screen that emits large amounts of EMI/RFI, UV or IR.

The embodiment shown in FIG. 10 may be assembled using conventional film making, coating and laminating procedures. For example, Ag/Ti stack of layer 29 is formed on film 28 by conventional sputtering and hardcoat layer 32 is applied onto layer 31 using conventional hardcoating techniques either before or after lamination of the remaining layers. The entire multilayered structure is assembled into a laminate using conventional laminating adhesives and adhesive layer 27 is applied using conventional adhesive coating technology.

Another potentially advantageous combination of filters comprises the above-described Ag/Ti or the Ag/Au low resistance sputtered stack or the stacks having the sequence of dielectric layer/IR reflecting metal layer/dielectric layer or the sequence of IR reflecting metal layer/dielectric layer/ IR reflecting metal layer, the above-described IR absorbing layer which preferably comprises LaB$_6$ and antimony tin oxide, and one or two UV screening films. An example of the second combination is illustrated in FIG. 11.

Figure 11:
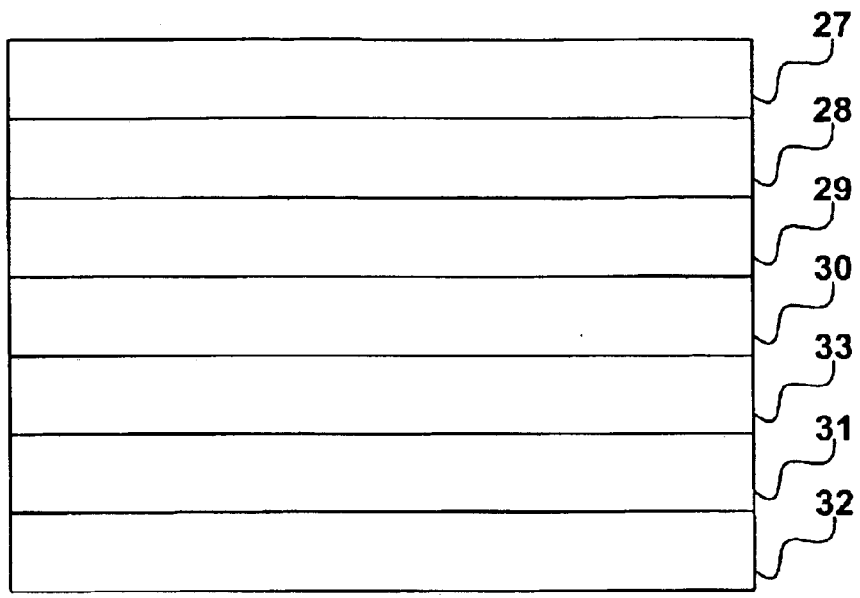

Turning to FIG. 11, this embodiment of the invention includes layers 27–33. Layers 27–32 may be the same material as layers 27–32 of FIG. 10. Layer 33 in FIG. 11 is the aforementioned IR absorbing layer which preferably comprises LaB$_6$ and antimony tin oxide.

The combination of filters exemplified in FIG. 11 provides IR rejection at the near IR wavelength range due to the incorporation of layer 33 therein. In addition, the second combination provides high EMI/RFI shielding attenuation and provides standard and high UV rejection. Standard UV rejection is provided by the embodiments of FIGS. 10 and 11 wherein layer 31 is a clear film. Higher UV rejection is obtained when layer 31 is the UV screening film in the embodiment shown in FIGS. 10 and 11.

The example illustrated by FIG. 11 may be adhered to window glazing or to a plasma display screen or other type of display screen that emits large amounts of EMI/RFI or that emits large amounts of UV or IR light.

The embodiment shown in FIG. 11 may be assembled using the same conventional film making, coating and laminating procedures as described for the embodiment of FIG. 10 but which further includes coating a layer of IR absorbing material (e.g., a layer comprising $LaB_6$ and antimony tin oxide) onto film 31.

A third possible combination of filters utilized in this invention comprises the previously described sputtered metal or metal stack (electrically conductive metal such as copper optionally sandwiched between two corrosion protection layers), one or more of the UV screening material of layer 28 as described above, and any of the yellow films described herein, especially the Q2186 yellow film. The third combination of filters is exemplified in FIG. 12 that includes layers 27–34. Layers 27, 28, 29, 30, 32 and 33 may be the same material as the corresponding numbered layers in FIG. 11.

Layer 31 in FIGS. 10 and 11 comprises a clear film or a UV screening film. Layer 31 in the example illustrated by FIG. 12 is the UV screening film so that there are two UV screening films in the combination exemplified by FIG. 12 (layers 28 and 31).

Figure 12:
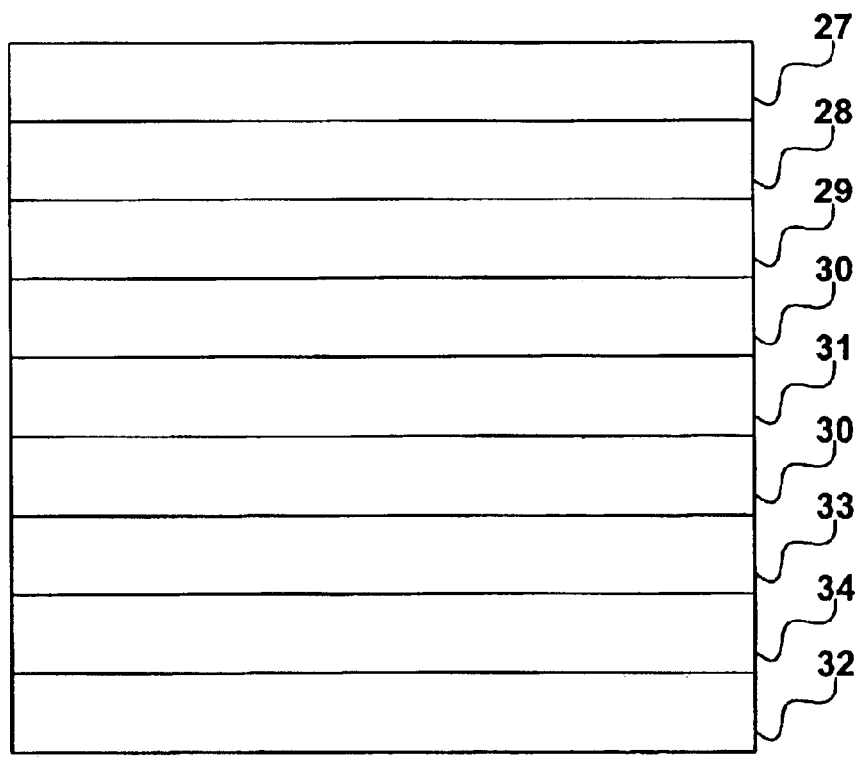

The combination shown in FIG. 12 further includes a yellow filter layer 34, preferably the yellow film Q2186 as described herein.

The third combination of filters illustrated in FIG. 12 offers high visible light transmission and IR rejection at the near IR wavelengths due to the presence of layer 33. In addition this embodiment provides enhanced EMI/RFI shielding attenuation and high UV rejection due to the combination of filters contained therein. The third combination may be applied to the glazing of a window as described herein.

Figure 13:
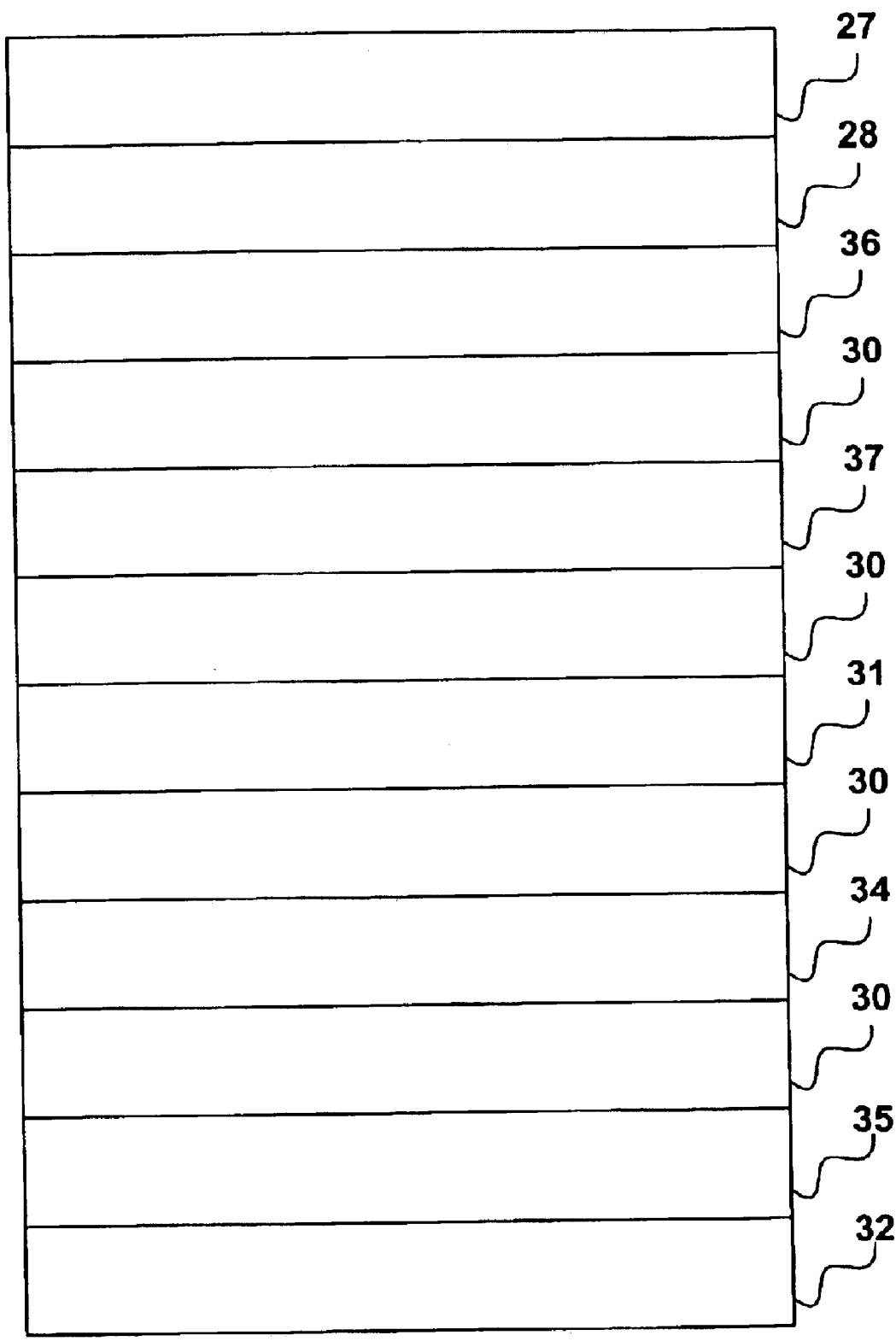

A fourth combination of filters utilizes the combination of filters illustrated in FIG. 7 and further includes a color correcting layer as described herein. An example of the fourth combination is illustrated in FIG. 13 that includes layers 27, 28, 36, 30, 37, 30, 31, 30, 34, 30, 35 and 32. Each of layers 30 shown in FIG. 13 is the laminating adhesive of layer 30 shown in FIGS. 10–12. Layers 27, 28, 32 and 34 are the same material as the corresponding numbered layers in FIGS. 10–12. Layer 36 is the same material as layer 12 in FIG. 7 and layer 37 is the same material as layer 14 in FIG. 7.

In particular, the yellow cast associated with the various embodiments of the invention that include a yellow film layer can be altered to produce a more aesthetically pleasing color by the incorporation of a color correcting layer in the combination of filters. Any gray or dark gray colored film can be used to counteract the yellow color (although other colors may be used as well). For example, a gray or dark gray reflective stack having an overall visible light transmission of about 10% is suitable for this purpose. An example of such a stack comprises an aluminized PET film (PET sputter coated with Al) interposed between two layers of gray film (e.g., PET film treated with dye or dyes to produce a gray color). The aluminized PET desirably has a 45% visible light transmission and each of the dyed films desirably have a visible light transmission of about 35% to yield an overall visible light transmission of about 10%. The aluminized PET and the two dyed films are laminated together to form a sandwich structure with the aluminized PET film interposed between the two dyed film layers.

As noted above, layer 31 in the first combination may be a clear film or a UV screening film. Layer 31 in FIG. 13 is desirably the clear film.

Layer 35 in FIG. 13 is the color-correcting layer described herein. Preferably the color correcting layer of layer 35 is the structure described herein that contains the aluminized PET sandwiched between two gray dyed films.

Figure 14:
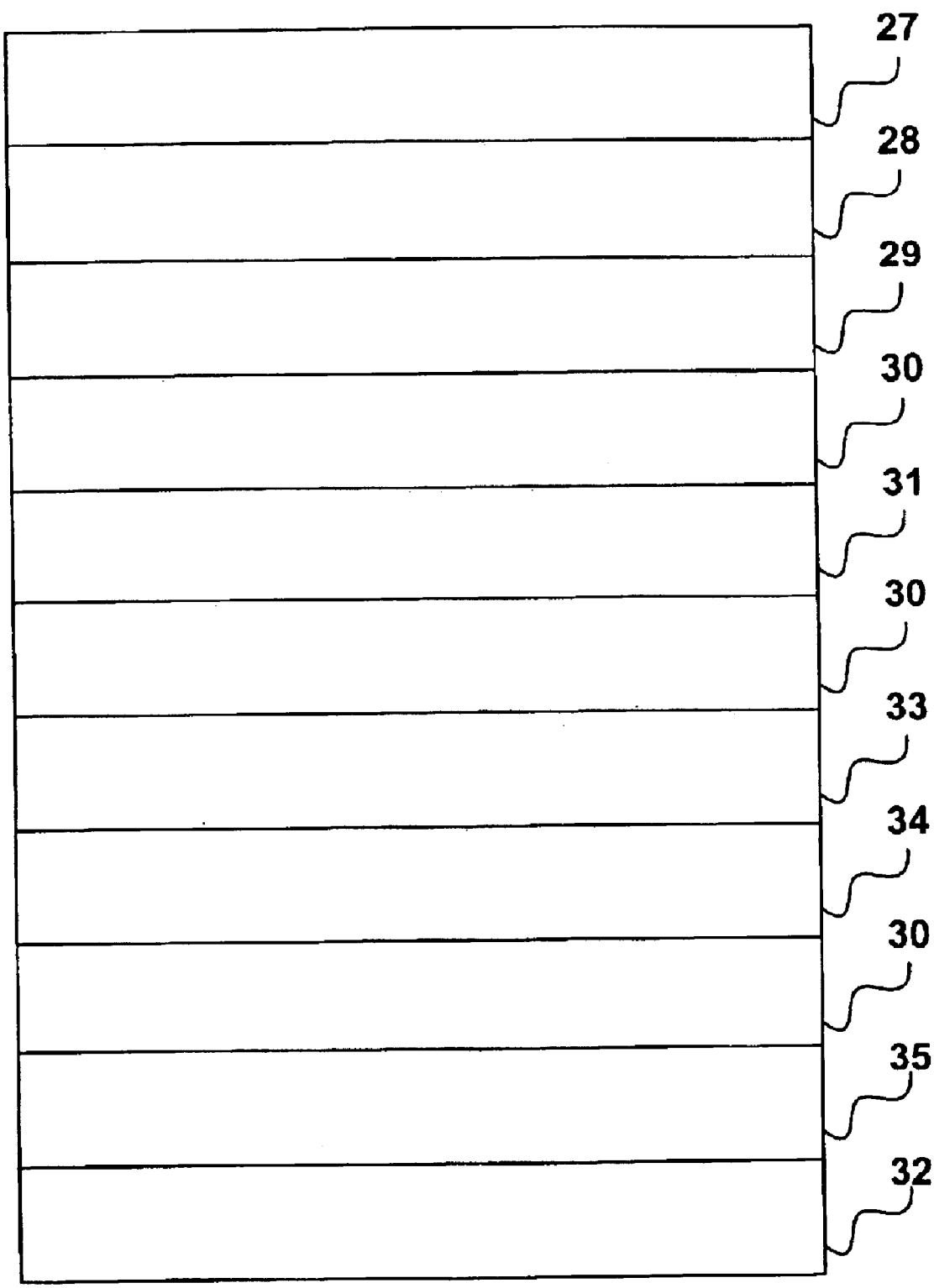

A fifth combination of filters comprises the Ag/Ti or the Ag/Au low resistance sputtered stack, the $LaB_6$ IR absorbing layer, the yellow film such as yellow film Q2186, and an optional UV screening film. In addition to the above combination of filters, the fifth combination further includes the above-described color-correcting layer. An example of the fifth combination of filters is illustrated in FIG. 14 that includes layers 27, 28, 29, 30, 31, 30, 33, 34, 30, 35 and 32. Layers 27, 28, 29, 30, 33, 31 and 32 may be the same material as the corresponding numbered layers in FIGS. 10 and 11. Layer 35 in FIG. 14 is the color-correcting layer that is the same as layer 35 in FIG. 13. Layer 34 in FIG. 14 is the yellow film Q2186 of layer 34 in FIGS. 12 and 13.

The fifth combination depicted in FIG. 14 offers high visible light transmission, IR rejection at the near IR wavelengths due to the combination of filters, particularly the filter of layer 33. In addition, the fifth combination provides enhanced EMI/RFI shielding attenuation and provides very high UV and visual light rejection. The fifth combination may be applied to the glazing of a window as described herein or may be applied to the screen of a computer monitor particularly a plasma display screen of a monitor.

A sixth combination of filters omits the yellow film to avoid the aesthetically unpleasant lighting conditions produced when the yellow film is included in the combination of filters. By omitting the yellow film, a lower level of anti-surveillance security is achieved but the level is nonetheless effective for most applications, particularly business and home use applications. The embodiment that avoids the yellow film does not have to resort to using the color control layer that significantly reduces the transmission of visible light there through. The combination of filters employed in the sixth combination of filters comprises the sputtered stack of layer 36 used in the fourth combination of filters, the heat reflecting sputtered stack used in layer 37 of the fourth combination of filters and the UV screening material of layer 28 used in the example illustrated in FIG. 10.

Figure 15:
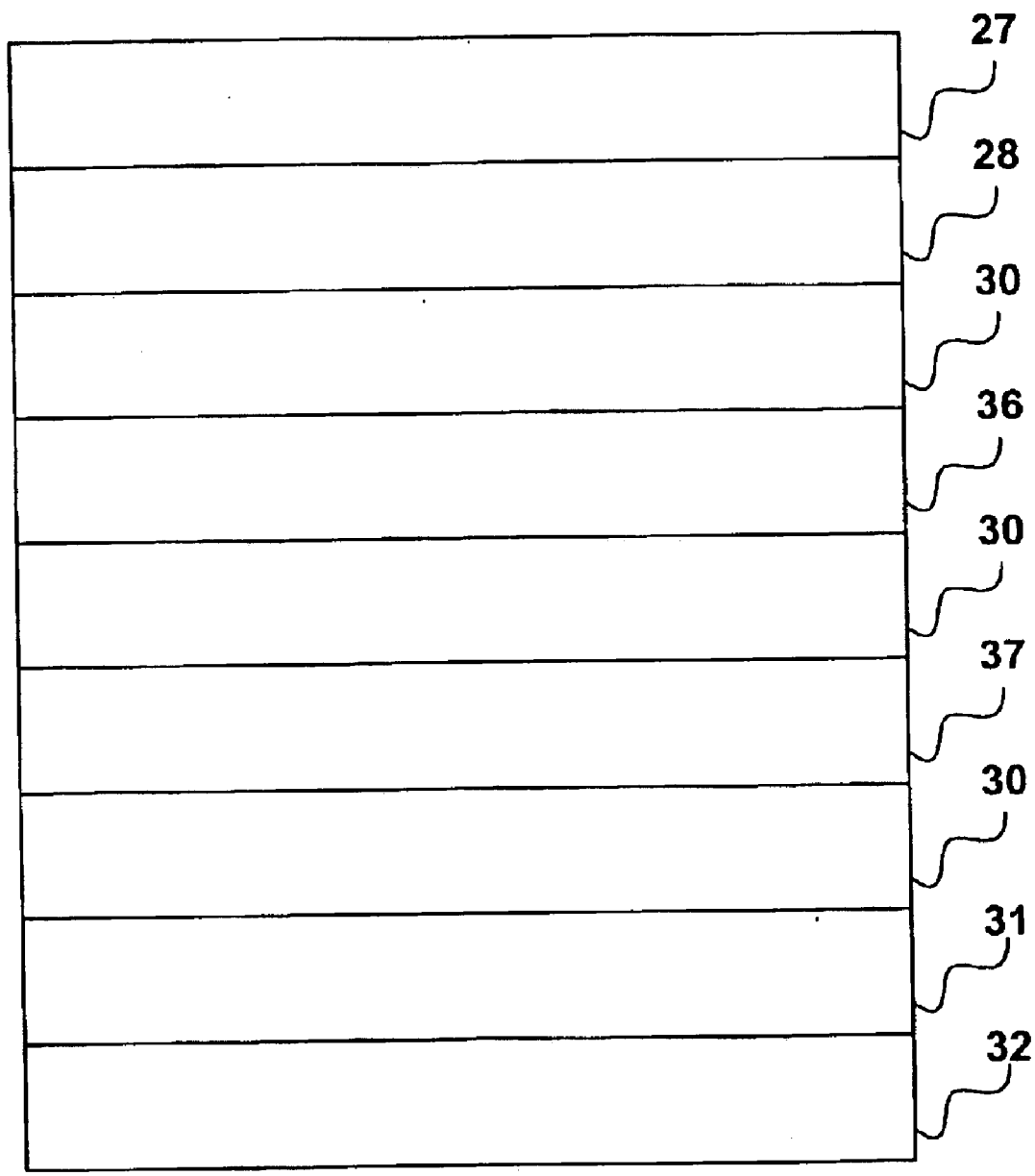

The sixth combination of filters is exemplified in FIG. 15 that includes the sequence of layers 27, 28, 30, 36, 30, 37, 30, 31 and 32 that are the same material as the corresponding numbered layers in the embodiments illustrated in FIGS. 10–14. The sixth combination of filters such as the combination of filters illustrated in FIG. 15 may be applied to the glazing of a window or may be applied to the display screen of a computer monitor.

The embodiment shown in FIG. 15 may be assembled using the same conventional techniques described above. In particular, layer 36 is made by sputter coating the metal stack (copper layer interposed between two nickel/chrome alloy layers) onto a transparent plastic film such as a 1 mil PET film. Layer 37 is formed by sputter coating the metal-oxide stack onto a 1 mil clear weatherable PET film with UV absorbers dyed into it to produce at least 2.4 optical density absorbance. Layers 36 and 37 along with films 28 and 31 are laminated together using the laminating adhesive layers 30, and adhesive layer 27 is applied using conventional adhesive coating technology. Optional hardcoat layer 32 may be applied to film 31 using conventional hardcoat coating techniques either before or after lamination of the remaining layers.

Figure 16:
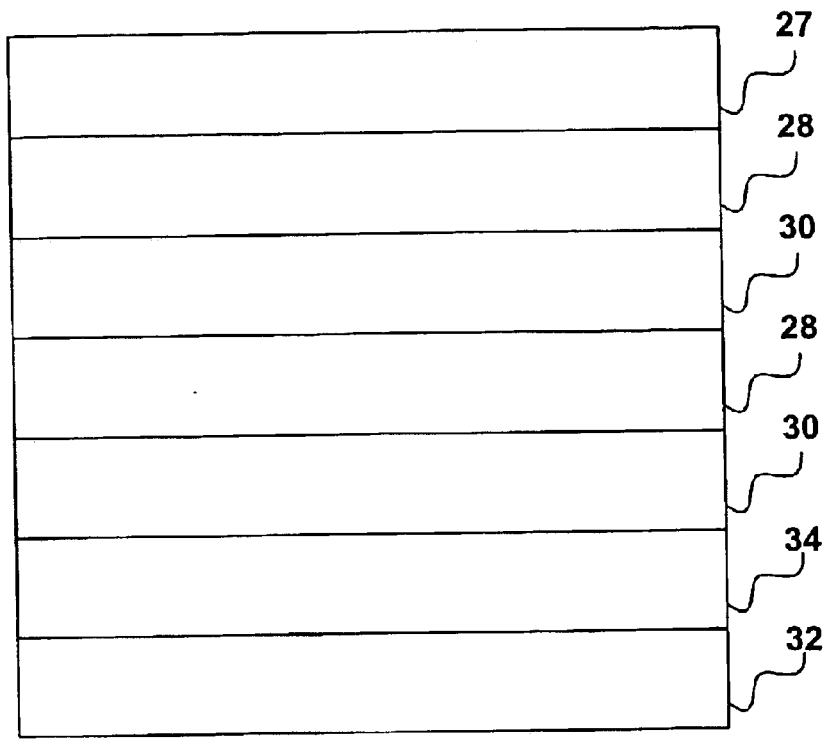

A seventh combination of filters comprises the yellow film Q2186 and two UV screening films. An example of the seventh combination is illustrated in FIG. 16 and includes the sequence of layers 27, 28, 30, 28, 30, 34 and 32. Each of the layers utilized in the seventh combination of filters is the same material as the corresponding numbered layers in FIGS. 10–15.

The seventh combination of filters, such as the example illustrated in FIG. 16, may be applied to window glazing or may be applied directly to the screen of a computer monitor to prevent eavesdropping in the ultraviolet and visible light wavelengths. This combination of filters and other combinations that are applied to the screen of a computer may be adhesively secured to the monitor or may be mechanically secured.

Each of the embodiments of the invention illustrated in FIGS. 10–16 advantageously includes a temporary release liner that covers an exposed surface of adhesive layer 27.

FIG. 17 illustrates the location of release liner 38 secured to adhesive layer 27. Reference numeral 39 in FIG. 17 represents the various layers located below adhesive layer 27 in the embodiments shown in FIGS. 10–16. Removal of release liner 38 allows the combination of filters to be adhesively secured to a desired substrate such as the glazing of a window or the screen of a computer monitor.

The release liner 38 used in the various embodiments of this invention may be any conventional release liner known to those skilled in the art. For example, the release liner may be a 1 mil PET film with a silicone release coating thereon. Any suitable silicone release coating may be used, such as a tin catalyzed silicone release that has about 10 grams per inch release characteristic. Non-silicone release formulations may be substituted for the silicone release layer.

The adhesive layer 27 used in the various embodiments of this invention may be any adhesive known to those skilled in the art for attaching a plastic sheet to glass. Pressure sensitive adhesives are particularly suitable for this purpose. Alternatively, a non-pressure sensitive adhesive may be used, and this non-pressure sensitive adhesive is advantageously a clear distortion free adhesive such as a functional polyester-based adhesive having siloxane functionality that provides a strong bond to glass. The adhesive layer 27 may comprise the same material used for layer 9 as described for the embodiment illustrated in FIG. 7.

An example of a pressure sensitive adhesive includes an acrylic, solvent-based, pressure-sensitive adhesive that is applied at about 10 lb./ream coat weight. The pressure sensitive adhesive of layer 27 may include 4% by weight of a UV absorber such as a benzotriazole UV absorber. Such a pressure sensitive adhesive is commercially available as National Starch 80-1057. Other adhesives or adhesive types may be substituted for the PSA adhesive as can other types of UV absorbers. It should be appreciated by one of ordinary skill in the art that these UV absorbers function as stabilizers, and may be added to the present invention to protect the adhesive from deterioration (e.g., deterioration caused by sunlight). These stabilizers, however, are not required to practice the invention.

The adhesive layer, such as layer 27, may be omitted if the combination of filters is in the form of a flexible bag or a tent.

Layer 28 used in the various embodiments of this invention is a weatherable PET UV screening film that is preferably a PET film with UV absorbers dyed into it in a sufficient amount to produce at least 2.4 optical density (OD) absorbance. A suitable PET film for layer 28 includes the film manufactured by the dyeing process described in U.S. Pat. No. 6,221,112. Other films with similar UV screening capability may be substituted for the above described film used in layer 28.

The thickness of the PET film used to make layer 28 may be varied. For example, the film used in layer 28 in FIGS. 10, 11, 12, 13 and 14 is desirably 1 mil thick to provide sufficient support for other layers used in the overall structure. The thickness of layer 28 in FIGS. 15 and 16 may be 0.5 mil thick.

The low resistance sputtered stack of layer 29 used in the various embodiments of this invention may be either the Ag/Ti or the Ag/Au stack as described herein or a similar configuration on a PET clear substrate such stacks having the sequences of: dielectric layer/IR reflecting metal layer/ dielectric layer or IR reflecting metal layer/dielectric layer/ IR reflecting metal layer. The low resistance stack provides higher visible light transmission.

The laminating adhesive layer 30 used in the various embodiments of the invention may be any conventional laminating adhesive including pressure sensitive adhesives known to those skilled in the art of the technological area of this invention. A useful laminating adhesive includes any conventional polyester adhesive with an isocyanate cross-linker added thereto. An example of such a laminating adhesive is Rohm and Haas's Adcote 76R36 adhesive with catalyst 9H1H. The adhesive may be applied at 1–1.5 lb. per ream coat weight. Other laminating adhesives may be substituted for the above-noted polyester-type adhesive.

Layer 31 used in the various embodiments of this invention is a clear plastic film such as clear PET that is optionally provided with a UV screening capability as described above with respect to layer 28. Thus, the clear PET layer 31 is preferably a clear PET film that optionally has UV absorbers dyed into it in a sufficient amount to produce at least 2.4 OD absorbance. The thickness of the PET film used in layer 31 may be varied. For example, the PET film used in layer 31 of FIGS. 10, 12, 13, 15 and 16 may be 0.5 mil thick. The PET of layer 31 in FIGS. 11 and 14 may be 0.5 or 1 mil thick. Also, layer 31 in FIGS. 13 and 15 is clear PET film without UV absorbers dyed into it. The PET film of layer 31 in FIG. 12 includes UV absorbers dyed into it at least 2.4 OD absorbance. The PET of layer 31 in FIGS. 10, 11 and 14 may be either the clear PET without the UV absorbers dyed into it or may be the clear PET with UV absorbers dyed into it in a sufficient amount to produce at least 2.4 OD absorbance. The 2.4 optical density absorbance referred to herein is measured at 358 nm wavelength.

The hardcoat layer 32 used in the various embodiments of this invention may be formed from any of the hardcoat materials described herein or from any other conventional hardcoat material. Layer 32 used in the various embodiments of this invention is preferably 1–2 microns thick. The hardcoat is used to protect the combination of filters from damage and therefore the hardcoat may be omitted when the combination of filters is in a protected area where damage is not likely to occur. A suitable hardcoat composition includes the hardcoat described in U.S. Pat. No. 4,557,980, the specification of which is incorporated herein by reference.

Layer 33 used in the various embodiments of this invention is the aforementioned IR absorbing layer that preferably comprises $LaB_6$ and/or antimony tin oxide as a coating or film.

Layer 34 used in the various embodiments of this invention is any of the yellow films described herein. Preferably layer 34 in the various embodiments of this invention is a yellow 1 mil film Q 2186.

Layer 36 used in the various embodiments of this invention may be a 1 mil PET film or a functionally equivalent plastic film with a sputtered heat reflecting-conductive metal stack coating made up of a copper layer interposed between two nickel/chrome alloy layers. Layer 36 has a visible light transmission of about 35%. The nickel/chrome alloy layers are preferably Hastelloy C276 or Inconel 600. Layer 36, which includes the film with the metal stack deposited thereon, preferably has a sheet resistance which is less than 8 ohms per square.

Layer 37 used in the various embodiments of this invention is a heat reflecting film of layer 14, which preferably includes the above-discussed sputtered metal/oxide stack (described in U.S. Pat. No. 6,007,901) on a 1 mil clear weatherable polyester (PET) film. The polyester film has UV absorbers dyed into it at 2.4 or more OD UV absorbance (2.4 OD UV absorbing PET). This film may be dyed using the dyeing process described in U.S. Pat. No. 6,221,112. Other films with similar UV screening capability may be used in place of the aforementioned UV screening film.

Layer 35 used in the various embodiments of this envision is a color correcting layer. Preferably, the color correcting layer 35 is the structure described herein that contains an illuminized PET sandwiched between two gray dyed films.

According to a preferred embodiment of the present invention, two spaced apart filter combinations are utilized in combination with a window glazing unit to provide enhanced security. For example, a film comprising a combination of filters may be adhered to each side of a glazing unit (e.g., glass or plastic glazing) or one film comprising a combination of filters may be adhered to each of two spaced apart transparent sheets of a glazing unit. Alternatively, two spaced apart films each of which comprises a combination of filters may be spaced apart within the space located between two spaced apart transparent sheets of a glazing unit.

In another embodiment of the spaced apart filter combinations, each of the filter combinations are embedded (preferably completely embedded) within a PVB interlayer of a glazing unit which includes at least one PVB layer interposed between two transparent sheets of glazing material (e.g., glass or plastic). More preferably one filter combination is embedded in a first PVB interlayer and another filter combination is embedded in a second PVB interlayer spaced apart from the first PVB interlayer. An example of this more preferred embodiment is illustrated in FIGS. 18 and 19.

The embodiment depicted in FIG. 18 includes front and rear surfaces 49 and 50, glass layers 41, 42 and 43 with PVB interlayer 44 interposed between glass layers 41 and 42, and PVB interlayer 45 interposed between glass layers 42 and 43. The PVB layers 44 and 45 fill the gap between the glass sheets and include films 47 and 48 embedded therein. Films 47 and 48 comprise any of the above-described filter combinations as a component thereof. Preferably each edge 46 of films 47 and 48 lie within the PVB so that the edges are not exposed to water, oxygen or other corrosive or harmful environmental conditions. The edges, being embedded within the PVB interlayer, thereby produce a "picture frame" configuration as shown in FIG. 19 wherein the edge 46 of film 47 (and likewise edge 46 of film 48) is spaced apart from the edge 51 of the entire structure.

The PVB layers are conventionally used in window manufacturing and serve to adhere the glass sheets to form a laminate which functions as a safety glass. The PVB layers used in this invention may be substituted with other similar plastic laminating layers such as polyurethane. The preferred glass layers may be substituted with other window glazing materials such as polycarbonate and polyacrylics. Thus the embodiment depicted in FIG. 18 may use alternating layers of glass, polycarbonate and polyacrylic instead of the three glass layers.

FIG. 20 depicts an embodiment of the invention that includes a glass substrate connected to any of the filter combinations of the invention with a glass fragmentation safety film adhered thereto. In FIG. 20, reference numeral 52 represents the combination of a glass substrate connected to any of the filter combinations of the invention and reference numeral 53 represents a flexible plastic film such as PET film adhesively secured to the combination 52.

Another embodiment of the invention that utilizes two spaced apart filter combinations is illustrated in FIG. 21. The embodiment depicted in FIG. 21 is glazing for a window and includes therein two spaced apart films 47 and 48 comprising any of the filter combinations described herein. Layer 54 adhesively secures film 47 to film 48. Layer 54 may be a conventional safety glass interlayer such as PVB. Because PVB generally requires a relatively thick application to form layer 54, layer 54 may alternatively be an adhesive forming a relatively narrower spacing between films 47 and 48. In particular, adhesives may typically be applied in relatively thin layers, and the thickness of the adhesive may be adjusted as needed to regulate and achieve a desired spacing between films 47 and 48.

Furthermore, the PVB or adhesive of interlayer 54 may be electrically conductive. For instance, electrical conductivity may be achieved by known techniques, such as incorporating electrically conductive particles within the layer.

The embodiment depicted in FIG. 21 may also include conventional interlayers 55 and 56 made of PVB or similar materials, and glass sheets 57 and 58 on the outer surfaces thereof.

The foregoing description of the preferred embodiments of the invention has been presented for the purposes of illustration and description. It is not intended to be exhaustive or to limit the invention to the precise form disclosed. Many modifications and variations are possible in light of the above teaching. For instance, various additional known materials may be added to the filtering method and system of the present invention. Specifically, the embodiments described herein include instances where the filters or combination of filters are applied onto a film such as a plastic film that, in turn, is adhered to window glazing. However it is within the scope of this invention to omit the film or films used for any filter or combination of filters and apply the filter or combination of filters onto or within a component of window glazing. It is intended that the scope of the invention be limited not by this detailed description, but rather by the claims appended hereto. Many embodiments of the invention can be made without departing from the spirit and scope of the invention.

What is claimed is:

1. A transmission filtering system comprising:
    a yellow film first filter; said first filter having a light transmission at wavelengths below 450 nm of less than 50%; and
    a second filter connected to said first filter, wherein said second filter is either:
        a light filter (a) comprising a heat reflecting film and a metallic layer, or
        a light filter (b) comprising a film having an IR transmission at wavelengths between 780 nm and 2500 nm of no more than 50%, or a light filter (c) comprising a multi-layered sputtered stack having a sheet resistance of less than 4 ohms per square whereby said filters are configured to attach to a substantially transparent subsurface, and whereby a combination of the filtering system and the subsurface causes a desired attenuation and filtering selected electromagnetic wavelengths, and whereby said dielectric of each dielectric layer has an index of refraction in the range of about 1.35 to 2.6.

2. The system of claim 1, wherein said combination of filter further comprises an IR absorbing filter.

3. The system of claim 1, wherein said electrically conductive metal layer of light filter (a) has at least the electrical conductivity of aluminum.

4. The system of claim 3, wherein said electrically conductive metal layer of light filter (a) is copper.

5. The system of claim 1, wherein said heat reflecting layer comprises a plurality of heat reflecting metal layers and a plurality of dielectric layers.

6. The system of claim 1, wherein said light filter (a) said two corrosion protection metal or metal alloy layers that sandwich the said electrically conductive metal layer to protect said electrically conductive metal layer from corrosion.

7. The system of claim 1, wherein said light filter (b) has a sheet resistance less than 4 ohms/square and comprises a film which exhibits a visible light transmittance of about 60–70% a visible reflectance of about 9%, a total solar transmittance of about 46% and a solar reflectance of about 22%.

8. The system of claim 1 wherein said electrically conductive metal layer of the light filter (c) is a metal oxide having an index of refraction in the range of about 1.7–2.6; and said IR reflecting metal of the light filter (c) is silver.

9. The system of claim 8 wherein the light filter (c) comprises an Ag/Ti or an Ag/Au sputtered stack on a transparent sheet, the sputtered stack having a sheet resistance less than 4 ohms/square.

10. The system of claim 9 wherein said Ag/Ti sputtered stack is made by sputter coating the following sequence of layers:
1) a layer of metal oxide,
2) a silver IR reflecting layer,
3) a protective sacrificial layer of titanium,
4) a layer of metal oxide,
5) a silver IR reflecting layer,
6) a protective sacrificial layer of titanium,
7) a metal oxide layer,
8) a silver IR reflecting layer,
9) a protective sacrificial layer of titanium,
10) a layer of metal oxide;
and wherein said Ag/Au sputtered stack is made by sputter coating the following sequence of layers onto said substrate or onto a transparent plastic sheet:
1) a layer of metal oxide,
2) a silver IR reflecting layer,
3) a layer of gold,
4) a layer of metal oxide,
5) a silver IR reflecting layer,
6) a layer of gold,
7) a layer of metal oxide,
8) a silver IR reflecting layer,
9) a gold layer, and
10) a layer of metal oxide.

11. The apparatus of claim 10, wherein said sequence of layers of said sputtered Ag/Ti stack is made by coating the following sequence of layers onto said transparent plastic sheet:
1) a layer of indium tin oxide about 30 nm thick,
2) a silver IR reflecting layer about 9 nm thick,
3) a protective sacrificial layer of titanium about 1 nm thick,
4) a layer of indium tin oxide about 70 nm thick,
5) a silver IR reflecting layer about 9 nm thick,
6) a protective sacrificial layer of titanium about 1 nm thick,
7) an indium tin oxide layer about 70 nm thick,
8) a silver IR reflecting layer about 9 nm thick,
9) a protective sacrificial layer of titanium about 1 nm thick, and
10) a layer of indium tin oxide about 30 nm thick;
and wherein said sequence of layers of said sputtered Ag/Au comprises the following sequence of layers coated onto said transparent plastic sheet:
1) a layer of indium tin oxide about 30 nm thick,
2) a silver IR reflecting layer about 9 nm thick,
3) a layer of gold about 1 nm thick,
4) an ITO layer about 70 nm thick,
5) a silver IR reflecting layer about 9 nm thick,
6) a layer of gold about 1 nm thick,
7) an ITO layer about 70 nm thick,
8) a silver IR reflecting layer about 9 nm thick,
9) a gold layer about 1 nm thick, and
10) an ITO layer about 30 nm thick.

12. The system of claim 1, wherein the combination further comprising a third light filter including one or more PET films with UV absorbers dyed therein in an amount to produce at least 2.4 optical density absorbance in each PET film.

13. The system of claim 1 wherein the combination furthers comprises a fourth filter having an IR transmission at wavelengths below 400 nm of less than 10%.

14. The system of claim 13, wherein the third filter has the wavelength transmission properties of FIG. 2.

15. The system of claim 13, wherein the fourth filter exhibits a percent light transmission at 320 nm and 380 nm that is less than 1% of the transmission at 550 nm, and a percent light transmission at 400 nm that is less than 50% of the transmission at 550 nm.

16. The system according to claim 1 further comprising a flexible transparent plastic sheet configured for attachment to a glazing of a window.

17. The system of claim 16, further comprising a glazing of a window.

18. The system of claim 17, wherein the system includes a single sheet configured to cover the glazing; and the system further includes an opaque electrically conductive sealant applied so as to cover any exposed portions of the glazing not covered by the sheet.

19. The system of claim 16, wherein the system is configured for attachment to at least one of a screen, monitor, and other stand-alone devices.

20. The system of claim 1, the system being configured to form a containment system.

21. The system of claim 20 wherein an adhesive layer connects the plastic sheet to a glazing.

22. The system of claim 21 wherein visible air bubbles are substantially excluded between the plastic sheet and the glazing.

23. The system of claim 1, wherein the combination of filters minimizes flying glass fragments.

24. The system of claim 1 wherein the combination of filters are in the form of layers connected to a plastic sheet.

25. The system of claim 24 wherein an adhesive layer connects the plastic sheet to a glazing.

26. The system of claim 1 further comprising a color correcting layer.

27. A method for adapting a transparent substrate to prevent or attenuate the passage therethrough of selected electromagnetic wavelengths as needed for security, said method comprising the step of applying a visually transparent electromagnetic filter apparatus onto said substrate, said transparent electromagnetic filter apparatus comprising a first yellow film inhibiting selected light transmissions; and a second film connected to said first film, wherein said second film is either:

a light filter (a) comprising a heat reflecting layer and an electrically conductive metal layer, or a light filter (b) having an IR transmission at wavelengths between 780 nm and 2500 nm of no more than 50%, or a light filter (c) which has a sheet resistance of less than 4 ohms per square and comprises a sequence of layers:

a dielectric layer/IR reflecting metal layer/dielectric layer or

IR reflecting metal layer/dielectric layer/IR reflecting metal layer.

* * * * *